United States Patent
Ellis

(10) Patent No.: US 8,255,961 B2
(45) Date of Patent: Aug. 28, 2012

(54) SYSTEMS AND METHODS FOR CACHING DATA IN MEDIA-ON-DEMAND SYSTEMS

(75) Inventor: Michael D Ellis, Boulder, CO (US)

(73) Assignee: United Video Properties, Inc., Santa Clara, CA (US)

( * ) Notice: Subject to any disclaimer, the term of this patent is extended or adjusted under 35 U.S.C. 154(b) by 1369 days.

(21) Appl. No.: 09/974,666

(22) Filed: Oct. 9, 2001

(65) Prior Publication Data

US 2002/0042921 A1 Apr. 11, 2002

Related U.S. Application Data

(60) Provisional application No. 60/239,377, filed on Oct. 11, 2000, provisional application No. 60/270,351, filed on Feb. 21, 2001.

(51) Int. Cl.
*H04N 7/173* (2011.01)
(52) U.S. Cl. .............................. 725/93; 725/40; 709/219
(58) Field of Classification Search .............. 725/37–61, 725/87–118; 709/217–232
See application file for complete search history.

(56) References Cited

U.S. PATENT DOCUMENTS

| | | | |
|---|---|---|---|
| 4,355,415 A | 10/1982 | George et al. | |
| 4,488,179 A | 12/1984 | Krüger et al. | |
| 4,602,279 A | 7/1986 | Freeman | |
| 4,694,490 A | 9/1987 | Harvey et al. | |
| 4,704,725 A | 11/1987 | Harvey et al. | |
| 4,706,121 A | 11/1987 | Young | |
| 4,718,107 A | 1/1988 | Hayes | |
| 4,745,549 A | 5/1988 | Hashimoto | |
| 4,751,578 A | 6/1988 | Reiter et al. | |
| 4,787,063 A | 11/1988 | Muguet | |
| 4,847,698 A | 7/1989 | Freeman | |
| 4,857,999 A | 8/1989 | Welsh | |
| 4,908,707 A | 3/1990 | Kinghorn | |
| 4,930,158 A | 5/1990 | Vogel | |
| 4,959,720 A | 9/1990 | Duffield et al. | |
| 4,963,994 A | 10/1990 | Levine | |
| 4,965,825 A | 10/1990 | Harvey et al. | |
| 4,977,455 A | 12/1990 | Young | |
| 5,027,400 A | 6/1991 | Baji et al. | |
| 5,038,211 A | 8/1991 | Hallenbeck | |
| 5,047,867 A | 9/1991 | Strubbe et al. | |
| 5,109,279 A | 4/1992 | Ando | |
| 5,109,414 A | 4/1992 | Harvey et al. | |
| 5,134,719 A | 7/1992 | Mankovitz | |
| 5,151,789 A | 9/1992 | Young | |

(Continued)

FOREIGN PATENT DOCUMENTS

EP 0 424 469 B1 5/1991

(Continued)

OTHER PUBLICATIONS

CableData brochure, "A New Approach to Addressability" (undated).

(Continued)

*Primary Examiner* — Annan Shang
(74) *Attorney, Agent, or Firm* — Ropes & Gray LLP

(57) ABSTRACT

Systems and methods may be provided for retrieving non-on-demand media data and on-demand media data that is provided by separate data sources. On-demand media data may be cached to reduce system latencies and the burden on the distribution network.

93 Claims, 19 Drawing Sheets

U.S. PATENT DOCUMENTS

| | | |
|---|---|---|
| 5,155,591 A | 10/1992 | Wachob |
| 5,172,413 A | 12/1992 | Bradley et al. |
| 5,200,822 A | 4/1993 | Bronfin et al. |
| 5,223,924 A | 6/1993 | Strubbe |
| 5,231,493 A | 7/1993 | Apitz |
| 5,233,654 A | 8/1993 | Harvey et al. |
| 5,249,043 A | 9/1993 | Grandmougin |
| 5,253,066 A | 10/1993 | Vogel |
| 5,299,006 A | 3/1994 | Kim |
| 5,335,277 A | 8/1994 | Harvey et al. |
| 5,339,434 A | 8/1994 | Rusis |
| 5,341,350 A | 8/1994 | Frank et al. |
| 5,353,121 A | 10/1994 | Young et al. |
| 5,357,276 A | 10/1994 | Banker et al. |
| 5,404,505 A | 4/1995 | Levinson |
| 5,404,567 A | 4/1995 | DePietro et al. |
| 5,410,344 A | 4/1995 | Graves et al. |
| 5,412,720 A | 5/1995 | Hoarty |
| 5,414,455 A * | 5/1995 | Hooper et al. .................. 725/88 |
| 5,426,699 A | 6/1995 | Wunderlich et al. |
| 5,442,389 A | 8/1995 | Blahut et al. |
| 5,461,415 A | 10/1995 | Wolf et al. ........................ 348/7 |
| 5,465,385 A | 11/1995 | Ohga et al. |
| 5,483,278 A | 1/1996 | Strubbe et al. |
| 5,485,197 A | 1/1996 | Hoarty |
| 5,485,221 A * | 1/1996 | Banker et al. ................. 348/563 |
| 5,502,504 A | 3/1996 | Marshall et al. |
| 5,517,257 A | 5/1996 | Dunn et al. |
| 5,523,794 A | 6/1996 | Mankovitz et al. |
| 5,523,796 A | 6/1996 | Marshall et al. |
| 5,524,195 A | 6/1996 | Clanton, III et al. |
| 5,524,271 A | 6/1996 | Hollmann et al. |
| 5,534,911 A | 7/1996 | Levitan |
| 5,537,141 A | 7/1996 | Harper et al. |
| 5,539,449 A | 7/1996 | Blahut et al. |
| 5,539,880 A | 7/1996 | Lakhani |
| 5,541,638 A | 7/1996 | Story |
| 5,541,738 A | 7/1996 | Mankovitz |
| 5,548,338 A | 8/1996 | Ellis et al. |
| 5,550,576 A | 8/1996 | Klosterman |
| 5,550,825 A | 8/1996 | McMullan, Jr. et al. |
| 5,557,338 A | 9/1996 | Maze et al. |
| 5,559,548 A | 9/1996 | Davis et al. |
| 5,559,549 A | 9/1996 | Hendricks et al. |
| 5,574,778 A | 11/1996 | Ely et al. |
| 5,576,755 A | 11/1996 | Davis et al. |
| 5,583,561 A | 12/1996 | Baker et al. |
| 5,583,563 A | 12/1996 | Wanderscheid et al. |
| 5,585,838 A | 12/1996 | Lawler et al. |
| 5,585,858 A | 12/1996 | Harper et al. |
| 5,589,892 A | 12/1996 | Knee et al. |
| 5,592,551 A | 1/1997 | Lett et al. |
| 5,594,509 A | 1/1997 | Florin et al. |
| 5,594,779 A | 1/1997 | Goodman |
| 5,600,364 A | 2/1997 | Hendricks et al. |
| 5,600,573 A | 2/1997 | Hendricks et al. |
| 5,602,582 A | 2/1997 | Wanderscheid et al. |
| 5,606,642 A | 2/1997 | Stautner et al. |
| 5,616,876 A | 4/1997 | Cluts |
| 5,619,247 A | 4/1997 | Russo |
| 5,619,249 A | 4/1997 | Billock et al. |
| 5,619,274 A | 4/1997 | Roop et al. |
| 5,623,613 A | 4/1997 | Rowe et al. |
| 5,625,678 A | 4/1997 | Blomfield-Brown |
| 5,629,733 A | 5/1997 | Youman et al. |
| 5,629,867 A | 5/1997 | Goldman |
| 5,630,119 A * | 5/1997 | Aristides et al. ........................ 1/1 |
| 5,632,007 A | 5/1997 | Freeman |
| 5,635,978 A | 6/1997 | Alten et al. |
| 5,635,987 A | 6/1997 | Park et al. |
| 5,648,824 A | 7/1997 | Dunn et al. |
| 5,652,613 A | 7/1997 | Lazarus et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,659,350 A | 8/1997 | Hendricks et al. |
| 5,666,645 A | 9/1997 | Thomas et al. |
| 5,675,743 A | 10/1997 | Mavity |
| 5,682,195 A | 10/1997 | Hendricks et al. |
| 5,694,163 A | 12/1997 | Harrison |
| 5,696,765 A | 12/1997 | Safadi |
| 5,699,107 A | 12/1997 | Lawler et al. |
| 5,708,961 A | 1/1998 | Hylton et al. |
| 5,710,601 A | 1/1998 | Marshall et al. |
| 5,717,452 A | 2/1998 | Janin et al. |
| 5,721,829 A | 2/1998 | Dunn et al. |
| 5,727,060 A | 3/1998 | Young |
| 5,731,844 A | 3/1998 | Rauch et al. |
| 5,732,216 A | 3/1998 | Logan et al. |
| 5,734,119 A | 3/1998 | France et al. |
| 5,734,853 A | 3/1998 | Hendricks et al. |
| 5,742,443 A | 4/1998 | Tsao et al. |
| 5,745,710 A | 4/1998 | Clanton, III et al. |
| 5,751,282 A | 5/1998 | Girard et al. |
| 5,752,159 A | 5/1998 | Faust et al. |
| 5,752,160 A | 5/1998 | Dunn |
| 5,754,771 A | 5/1998 | Epperson et al. |
| 5,758,257 A | 5/1998 | Herz et al. |
| 5,758,258 A | 5/1998 | Shoff et al. |
| 5,758,259 A | 5/1998 | Lawler |
| 5,760,821 A | 6/1998 | Ellis et al. |
| 5,768,528 A | 6/1998 | Stumm |
| 5,771,064 A * | 6/1998 | Lett ................................ 725/134 |
| 5,774,170 A | 6/1998 | Hite et al. |
| 5,778,182 A | 7/1998 | Cathey et al. |
| 5,778,187 A | 7/1998 | Monteiro et al. |
| 5,781,226 A | 7/1998 | Sheehan |
| 5,781,227 A | 7/1998 | Goode et al. |
| 5,781,246 A | 7/1998 | Alten et al. |
| 5,790,198 A | 8/1998 | Roop et al. |
| 5,790,423 A | 8/1998 | Lau et al. |
| 5,793,412 A | 8/1998 | Asamizuya |
| 5,793,971 A | 8/1998 | Fujita et al. |
| 5,794,217 A | 8/1998 | Allen |
| 5,796,952 A | 8/1998 | Davis et al. |
| 5,801,787 A | 9/1998 | Schein et al. |
| 5,802,284 A | 9/1998 | Karlton et al. |
| 5,805,154 A | 9/1998 | Brown |
| 5,805,763 A | 9/1998 | Lawler et al. |
| 5,805,804 A | 9/1998 | Laursen et al. |
| 5,805,806 A | 9/1998 | McArthur |
| 5,808,608 A | 9/1998 | Young et al. |
| 5,808,694 A | 9/1998 | Usui et al. |
| 5,809,246 A | 9/1998 | Goldman |
| 5,812,123 A | 9/1998 | Rowe et al. |
| 5,812,205 A | 9/1998 | Milnes et al. |
| 5,815,145 A * | 9/1998 | Matthews, III .................. 725/41 |
| 5,815,146 A | 9/1998 | Youden et al. |
| 5,818,438 A | 10/1998 | Howe et al. |
| 5,819,019 A | 10/1998 | Nelson |
| 5,819,160 A | 10/1998 | Foladare et al. |
| 5,822,530 A | 10/1998 | Brown |
| RE35,954 E | 11/1998 | Levine |
| 5,830,068 A | 11/1998 | Brenner et al. |
| 5,838,314 A | 11/1998 | Neel et al. |
| 5,841,979 A | 11/1998 | Schulhof et al. |
| 5,844,620 A | 12/1998 | Coleman et al. |
| 5,850,218 A | 12/1998 | LaJoie et al. |
| 5,861,906 A | 1/1999 | Dunn et al. |
| 5,881,245 A | 3/1999 | Thompson |
| 5,883,677 A * | 3/1999 | Hofmann ...................... 348/584 |
| 5,884,028 A | 3/1999 | Kindell et al. |
| 5,886,707 A | 3/1999 | Berg |
| 5,886,732 A | 3/1999 | Humpleman |
| 5,887,243 A | 3/1999 | Harvey et al. |
| 5,892,915 A | 4/1999 | Duso et al. |
| 5,894,589 A | 4/1999 | Reber et al. |
| 5,896,414 A | 4/1999 | Meyer et al. |
| 5,898,441 A | 4/1999 | Flurry |
| 5,898,456 A | 4/1999 | Wahl |
| 5,899,582 A | 5/1999 | DuLac |
| 5,900,904 A | 5/1999 | Okada et al. |
| 5,903,234 A | 5/1999 | Kimura et al. |
| 5,903,263 A | 5/1999 | Emura |
| 5,903,264 A | 5/1999 | Moeller et al. |
| 5,905,522 A | 5/1999 | Lawler |
| 5,905,847 A | 5/1999 | Kobayashi et al. |

| | | | | | | |
|---|---|---|---|---|---|---|
| 5,909,638 A | 6/1999 | Allen | | 6,177,931 B1 * | 1/2001 | Alexander et al. ............... 725/52 |
| 5,911,046 A | 6/1999 | Amano | | 6,199,206 B1 | 3/2001 | Nishioka et al. |
| 5,913,039 A | 6/1999 | Nakamura et al. | | 6,208,335 B1 | 3/2001 | Gordon et al. |
| 5,914,941 A | 6/1999 | Janky | | 6,209,129 B1 | 3/2001 | Carr et al. |
| 5,915,090 A | 6/1999 | Joseph et al. | | 6,226,444 B1 | 5/2001 | Goldschmidt et al. |
| 5,915,094 A | 6/1999 | Kouloheris et al. | | 6,239,794 B1 | 5/2001 | Yuen et al. |
| 5,916,303 A | 6/1999 | Scott | | 6,240,555 B1 | 5/2001 | Shoff et al. |
| 5,917,538 A | 6/1999 | Asamizuya | | 6,314,573 B1 * | 11/2001 | Gordon et al. ................. 725/61 |
| 5,917,835 A | 6/1999 | Barrett et al. | | 6,314,575 B1 | 11/2001 | Billock et al. |
| 5,920,702 A | 7/1999 | Bleidt et al. | | 6,637,029 B1 * | 10/2003 | Maissel et al. ................. 725/46 |
| 5,920,800 A | 7/1999 | Schafer | | 6,772,433 B1 | 8/2004 | LaJoie et al. |
| 5,922,045 A | 7/1999 | Hanson | | 2002/0090203 A1 | 7/2002 | Mankovitz |
| 5,922,048 A | 7/1999 | Emura | | 2002/0138840 A1 | 9/2002 | Schein et al. |
| 5,923,361 A | 7/1999 | Sutton, Jr. | | 2003/0040962 A1 * | 2/2003 | Lewis ............................ 705/14 |
| 5,926,204 A | 7/1999 | Mayer | | 2003/0149980 A1 | 8/2003 | Hassell et al. |
| 5,926,205 A | 7/1999 | Krause et al. | | 2003/0196201 A1 | 10/2003 | Schein et al. |
| 5,926,624 A | 7/1999 | Katz et al. | | 2004/0031050 A1 | 2/2004 | Klosterman |
| 5,928,327 A | 7/1999 | Wang et al. | | 2005/0160452 A1 | 7/2005 | Lawler et al. |
| 5,929,850 A | 7/1999 | Broadwin et al. | | | | |
| 5,930,473 A | 7/1999 | Teng et al. | | FOREIGN PATENT DOCUMENTS | | |
| 5,930,493 A | 7/1999 | Ottesen et al. | | EP | 0 447 968 | 9/1991 |
| 5,931,901 A | 8/1999 | Wolfe et al. | | EP | 0 535 749 A2 | 4/1993 |
| 5,933,603 A | 8/1999 | Vahalia et al. | | EP | 0 560 593 | 9/1993 |
| 5,933,835 A | 8/1999 | Adams et al. | | EP | 0 572 090 A | 12/1993 |
| 5,935,206 A | 8/1999 | Dixon et al. | | EP | 0 624 039 A2 | 11/1994 |
| 5,936,569 A | 8/1999 | Stahle et al. | | EP | 0 662 771 A1 | 7/1995 |
| 5,940,071 A | 8/1999 | Treffers et al. | | EP | 0 682 452 A2 | 11/1995 |
| 5,940,073 A | 8/1999 | Klosterman et al. | | EP | 0 711 076 A2 | 5/1996 |
| 5,943,046 A | 8/1999 | Cave et al. | | EP | 0 725 539 A2 | 8/1996 |
| 5,943,047 A | 8/1999 | Suzuki | | EP | 0 758 833 | 2/1997 |
| 5,945,987 A | 8/1999 | Dunn | | EP | 0 763 938 A2 | 3/1997 |
| 5,945,988 A * | 8/1999 | Williams et al. ............... 715/747 | | EP | 0 854 645 A2 | 7/1998 |
| 5,947,746 A | 9/1999 | Tsai | | EP | 0 874 524 A1 | 10/1998 |
| 5,949,411 A | 9/1999 | Doerr et al. | | EP | 0 986 046 A1 | 3/1999 |
| 5,956,482 A | 9/1999 | Agraharam et al. | | EP | 0 924 927 A2 | 6/1999 |
| 5,959,659 A | 9/1999 | Dokic | | EP | 0 944 253 A1 | 9/1999 |
| 5,961,603 A | 10/1999 | Kunkel et al. | | GB | 2 256 115 | 11/1992 |
| 5,963,202 A | 10/1999 | Polish | | JP | 60-61935 | 9/1985 |
| 5,964,455 A | 10/1999 | Catanzarite et al. | | JP | 6-110926 | 4/1994 |
| 5,969,714 A | 10/1999 | Butcher | | JP | 10-243375 | 9/1998 |
| 5,973,680 A | 10/1999 | Ueda | | JP | 11-45259 | 2/1999 |
| 5,973,722 A | 10/1999 | Wakai et al. | | JP | 11-219313 | 8/1999 |
| 5,974,217 A | 10/1999 | Haraguchi | | JP | 11-234228 | 8/1999 |
| 5,977,963 A | 11/1999 | Gaughan et al. | | JP | 2000-57078 | 2/2000 |
| 5,978,381 A * | 11/1999 | Perlman et al. ............... 370/432 | | TW | 247388 | 10/1994 |
| 5,978,567 A | 11/1999 | Rebane et al. | | WO | WO 88/04507 | 6/1988 |
| 5,978,843 A | 11/1999 | Wu et al. | | WO | WO 98/53611 | 11/1988 |
| 5,982,445 A | 11/1999 | Eyer et al. | | WO | WO 89/12370 | 12/1989 |
| 5,986,650 A | 11/1999 | Ellis et al. | | WO | WO 90/00847 | 1/1990 |
| 5,990,881 A | 11/1999 | Inoue et al. | | WO | WO 91/00670 | 1/1991 |
| 5,999,970 A | 12/1999 | Krisbergh et al. | | WO | WO 91/07050 | 5/1991 |
| 6,002,394 A | 12/1999 | Schein et al. | | WO | WO 92/04801 | 3/1992 |
| 6,002,720 A | 12/1999 | Yurt et al. | | WO | WO 93/08542 | 4/1993 |
| 6,005,564 A | 12/1999 | Ahmad et al. | | WO | WO 93/22877 | 11/1993 |
| 6,005,600 A | 12/1999 | Hill | | WO | WO 94/14284 | 6/1994 |
| 6,008,803 A | 12/1999 | Rowe et al. | | WO | WO 95/01058 | 1/1995 |
| 6,009,465 A | 12/1999 | Decker et al. | | WO | WO 95/15658 | 6/1995 |
| 6,012,089 A | 1/2000 | Hasegawa | | WO | WO 95/31069 | 11/1995 |
| 6,012,091 A | 1/2000 | Boyce | | WO | WO 95/32583 | 11/1995 |
| 6,014,381 A | 1/2000 | Troxel et al. | | WO | WO 95/32584 | 11/1995 |
| 6,014,693 A | 1/2000 | Ito et al. | | WO | WO 95/32585 | 11/1995 |
| 6,014,694 A | 1/2000 | Aharoni et al. | | WO | WO 95/32587 | 11/1995 |
| 6,014,706 A | 1/2000 | Cannon et al. | | WO | WO 96/09721 | 3/1996 |
| 6,018,359 A | 1/2000 | Kermode et al. | | WO | WO 96/17467 | 6/1996 |
| 6,018,765 A | 1/2000 | Durana et al. | | WO | WO 96/25821 | 8/1996 |
| 6,020,912 A | 2/2000 | De Lang | | WO | WO 96/33572 | 10/1996 |
| 6,022,223 A | 2/2000 | Taniguchi et al. | | WO | WO 96/34467 | 10/1996 |
| 6,023,725 A | 2/2000 | Ozawa et al. | | WO | WO 96/34491 | 10/1996 |
| 6,025,837 A | 2/2000 | Matthews et al. | | WO | WO 96/41472 | 12/1996 |
| 6,025,868 A | 2/2000 | Russo | | WO | WO 96/41478 | 12/1996 |
| 6,028,600 A * | 2/2000 | Rosin et al. ................... 715/718 | | WO | WO 97/13368 | 4/1997 |
| 6,029,064 A | 2/2000 | Farris et al. | | WO | WO 97/19555 | 5/1997 |
| 6,038,591 A | 3/2000 | Wolfe et al. | | WO | WO 97/21291 | 6/1997 |
| 6,052,145 A | 4/2000 | Macrae et al. ................ 348/10 | | WO | WO 97/29458 | 8/1997 |
| 6,141,488 A | 10/2000 | Knudson et al. | | WO | WO 97/32434 | 9/1997 |
| 6,147,715 A | 11/2000 | Yuen et al. | | WO | WO 97/34413 | 9/1997 |
| 6,157,377 A * | 12/2000 | Shah-Nazaroff et al. ..... 715/719 | | WO | WO 97/34414 | 9/1997 |
| 6,160,546 A | 12/2000 | Thompson et al. | | WO | WO 97/37500 | 10/1997 |
| 6,163,316 A * | 12/2000 | Killian ........................ 715/721 | | WO | WO 97/42763 | 11/1997 |

| | | |
|---|---|---|
| WO | WO 97/46016 | 12/1997 |
| WO | WO 97/46943 | 12/1997 |
| WO | WO 97/47124 | 12/1997 |
| WO | WO 97/48228 | 12/1997 |
| WO | WO 97/48230 | 12/1997 |
| WO | WO 97/49237 | 12/1997 |
| WO | WO 97/49242 | 12/1997 |
| WO | WO 98/00975 | 1/1998 |
| WO | WO 98/00976 | 1/1998 |
| WO | WO 98/01995 | 1/1998 |
| WO | WO 98/06219 | 2/1998 |
| WO | WO 98/07277 | 2/1998 |
| WO | WO 98/10589 | 3/1998 |
| WO | WO 98/12872 | 3/1998 |
| WO | WO 98/17033 | 4/1998 |
| WO | WO 98/17064 | 4/1998 |
| WO | WO 98/18260 | 4/1998 |
| WO | WO 98/19459 | 5/1998 |
| WO | WO 98/26528 | 6/1998 |
| WO | WO 98/26584 | 6/1998 |
| WO | WO 98/26596 | 6/1998 |
| WO | WO 98/27723 | 6/1998 |
| WO | WO 98/31115 | 7/1998 |
| WO | WO 98/31116 | 7/1998 |
| WO | WO 98/34405 | 8/1998 |
| WO | WO 98/38831 | 9/1998 |
| WO | WO 98/39893 | 9/1998 |
| WO | WO 98/47279 | 10/1998 |
| WO | WO 99/03267 | 1/1999 |
| WO | WO 99/04561 | 1/1999 |
| WO | WO 99/11060 | 3/1999 |
| WO | WO 99/12320 | 3/1999 |
| WO | WO 99/27681 | 6/1999 |
| WO | WO 99/28897 | 6/1999 |
| WO | WO 99/30491 | 6/1999 |
| WO | WO 99/39466 | 8/1999 |
| WO | WO 99/45700 | 9/1999 |
| WO | WO 99/45702 | 9/1999 |
| WO | WO 99/56466 | 11/1999 |
| WO | WO 99/56473 | 11/1999 |
| WO | WO 99/60783 | 11/1999 |
| WO | WO 99/60789 | 11/1999 |
| WO | WO 99/60790 | 11/1999 |
| WO | WO 99/65230 | 12/1999 |
| WO | WO 99/65244 | 12/1999 |
| WO | WO 99/66725 | 12/1999 |
| WO | WO 00/02380 | 1/2000 |
| WO | WO 00/04706 | 1/2000 |
| WO | WO 00/05885 | 2/2000 |
| WO | WO 00/05889 | 2/2000 |
| WO | WO 00/11869 | 3/2000 |
| WO | WO 00/16548 | 3/2000 |
| WO | WO 00/27122 | 5/2000 |
| WO | WO 00/33560 | 6/2000 |
| WO | WO 00/79798 | 12/2000 |
| WO | WO 01/01677 | 1/2001 |
| WO | WO 01/01689 | 1/2001 |
| WO | WO 01/19086 | 3/2001 |
| WO | WO 01/35662 | 5/2001 |
| WO | WO 01/46869 | 6/2001 |
| WO | WO 01/50743 | 7/2001 |
| WO | WO 01/58158 | 8/2001 |
| WO | WO 01/78382 | 10/2001 |

OTHER PUBLICATIONS

"Addressable Converters: A New Development at CableData," Via Cable, vol. 1, No. 12 (Dec. 1981).

Hofmann, Neumann, Oberlies, and Schadwinkel, "Videotext Programmiert Videorecorder," Rundfunktechnische Mitteilungen, Nov.-Dec. 1982, pp. 254-257 (translation abstract attached).

James Sorce et al., "Designing a Broadband Residential Entertainment Service: A Case Study," 13th International Symposium Human Factors in Telecommunications, Torino, Italy, Sep. 10-14, 1990 pp. 141-148.

Vito Brugliera, "Digital On-Screen Display—A New Technology for the Consumer Interface," Symposium Record Cable Sessions, 18th International Television Symposium and Technical Exhibition, Montreux, Switzerland Jun. 10-15, 1993, pp. 571-586 (Jun. 11, 1993).

Matthew D. Miller, "A Scenario for the Deployment of Interactive Multimedia Cable Television Systems in the United States in the 1990's," Proceedings of the IEEE, vol. 82, No. 4, pp. 585-589 (Apr. 1994).

Yee-Hsiang Chang et al., "An Open-Systems Approach to Video on Demand," IEEE Communications Magazine, vol. 32, pp. 68-80 (May 1994).

"Electronic Programme Guide (EPG); Protocol for a TV Guide using electronic data transmission" by European Telecommunication Standards Institute, May 1997, Valbonne, France, publication No. ETS 300 707.

Patent abstract for Japanese patent JP 10 065978, Patent Abstracts of Japan, vol. 1998, No. 08, Jun. 3, 1998.

"Windows 98 Feature Combines TV, Terminal and the Internet," New York Times, Aug. 18, 1998.

The New York Times, "2 Makers Plan Introductions of Digital VCR", by John Markoff, Mar. 29, 1999.

David M. Rudnick, United States Patent Application for "Interactive Television Program Guide System Having Graphic Arrangements of Program Event Regions," filed Apr. 1, 1999, U.S. Appl. No. 09/283,681.

Patent abstract for Japanese patent JP 11 032272, Patent Abstracts of Japan, vol. 1999, No. 05, May 31, 1999.

Patent abstract for Japanese patent JP 11 205711, Patent Abstracts of Japan, vol. 1999, No. 12, Jul. 30, 1999.

"Digital Video Broadcasting (DVB); DVB specification for data broadcasting", European Telecommunications Standards Institute. Draft EN 301 192 V1.2.1 (Jan. 1999).

HIS (Home information Server), Concept and prototype system of HIS (Home Information Server), vol. 98, No. 84, p. 63-68, Sep. 18, 1998 (English Abstract)

* cited by examiner

SYSTEMS AND METHODS FOR CACHING DATA IN MEDIA-ON-DEMAND SYSTEMS

CROSS-REFERENCE TO RELATED APPLICATION

This application claims the benefit of United States Provisional Patent Application Nos. 60/239,377 and 60/270,351, filed on Oct. 11, 2000 and Feb. 21, 2001, respectively.

BACKGROUND OF THE INVENTION

The present invention relates to systems and methods for interactive television applications. More particularly, the present invention relates to systems and methods for retrieving non-on-demand media data and on-demand media data from separate data sources in an interactive television application system.

Cable, satellite, and broadcast television systems provide users with a large number of television channels. Users have traditionally consulted printed television program schedules to determine the programs being broadcast at a particular time. More recently, interactive electronic television program guides have been developed that allow television program information to be displayed on a user's television.

Interactive television program guides are typically implemented on television set-top boxes. Such program guides allow users to view television program listings in different display formats. For example, a user may instruct the program guide to display a grid of program listings organized in a channel-ordered and time-ordered array. Users may also search and sort program listings by theme (e.g., movies, sports, etc.) or by title (e.g., alphabetically). A user may obtain additional information for a particular program listing, and may purchase a program for viewing.

Some interactive program guide systems may provide listings for on-demand videos. In some systems, the on-demand video listings are provided from a data source that is separate from the source that provides listings and other information for non-on-demand media, such as television programs. A video-on-demand server may, for example, provide the listings for on-demand videos to the program guide in-band with or out-of-band from the program guide data or normal television programming. When video-on-demand listings are provided in band, the program guide must establish a connection with the video-on-demand server (if one is not established), and tune the user away from the television program the user is watching in order to retrieve listings. This causes the user to miss part of the programming that he or she is watching. When video-on-demand listings are provided out-of-band, the program guide must also establish a connection with the video-on-demand server (if one is not established), and retrieve the listings. In such approaches, low bandwidth connections may cause unacceptable delays in the display of the video-on-demand listings. In addition, some video-on-demand information, such as new release listings, is frequently accessed by many users throughout the network. Each user's equipment must establish a session with the server every time information is needed. This may cause huge peak resource demands on the distribution network.

Accordingly, it would be desirable to provide systems and methods for retrieving non-on-demand media data and on-demand media data from separate data sources in a way that reduces the undesirable consequences associated with current approaches such as, for example, the disruption of the user's viewing experience or delays in displaying application screens.

SUMMARY OF THE INVENTION

The present invention relates to systems and methods for retrieving media data from separate non-on-demand and on-demand media data sources. Illustrative features of some embodiments of the present invention are described, for example, in: U.S. Provisional Patent Application No. 60/239,377, filed Oct. 11, 2000; U.S. Provisional Patent Application No. 60/252,171, filed Nov. 20, 2000; and U.S. Provisional Patent Application No. 60/270,351, filed Feb. 21, 2001 which are hereby incorporated by reference herein in their entirety.

As used herein, non-on-demand media may be any suitable media that is provided to users without a user request. For example, non-on-demand media may be television programs, audio programs, or any other suitable programs. On-demand media may be any suitable media that is provided to users in response to user requests. For example, on-demand media may be on-demand videos or on-demand audio media, downloadable software, or any other media suitable for on-demand distribution.

Data for on-demand and non-on-demand media may be any data which describes the media or is associated with the media. For example, non-on-demand media data may be television program titles, additional television program information, television programming advertisements, or pay-per-view ordering information. On-demand media data may be, for example, titles or descriptions of on-demand videos or downloadable software.

Non-on-demand media data and on-demand media data are retrieved from separate data sources by, for example, an interactive television application such as an interactive television program guide, or other software running on in-home equipment. The on-demand media data may be provided, for example, in-band or out-of-band from the non-on-demand media or non-on-demand media data. In some embodiments, the on-demand media data may be provided as a continuous or periodic data stream using, for example, a carousel-based approach. In other embodiments, the on-demand media data may be provided using a client-server based approach.

The on-demand media data is automatically retrieved and cached to reduce, for example, system latency or the disruption of the user's viewing experience. Caching the on-demand media data may be staggered in time among users to lessen the peak loads on the network which distributes the on-demand media data. The on-demand media data may be cached, for example, periodically or when the user invokes a particular interface. In some approaches, caching may be predictive. For example, on-demand media data for features accessible to a user from a given display may be cached. In other approaches, the most popular media on demand data may be cached. In still other approaches, the data that is cached may be personalized. For example, user activity may be monitored and the on-demand media may be cached based on the user history. Any other suitable predictive caching may be used.

On-demand media data may be retrieved from cache for display. For example, the on-demand media data may be retrieved from cache and displayed in response to a user indicating a desire to access at least the non-on-demand data in, for example, a non-on-demand media listings display. In some embodiments, the non-on-demand media listings may be displayed along with on-demand media listings, or other content such as panel or banner advertisements.

BRIEF DESCRIPTION OF THE DRAWINGS

Further features of the invention, its nature and various advantages will become more apparent from the following detailed description of the preferred embodiments, taken in conjunction with the following drawings, in which like reference characters refer to like parts throughout, and in which.

DETAILED DESCRIPTION OF VARIOUS EMBODIMENTS

Systems and methods for caching for non-on-demand and on-demand media data from multiple sources for use in an interactive television application may be based on any suitable hardware platform or topology. Suitable hardware may include, for example, satellite receivers, personal computer televisions (PC/TVS), personal computers (e.g., with television tuner cards), cable set-top boxes, or any other suitable hardware.

In some embodiments, an interactive television application, such as an interactive television program guide, home shopping application or other suitable interactive television application, may run on such hardware. Illustrative interactive television program guide systems are described, for example, in Knee et al. U.S. Pat. No. 5,589,892 and Knudson et al. U.S. patent application Ser. No. 09/357,941, filed Jul. 16, 1999, which are hereby incorporated by reference herein in their entireties. Client-server program guide systems are described, for example, in Ellis et al. U.S. patent application Ser. No. 09/374,043, filed Aug. 13, 1999, which is hereby incorporated by reference herein in its entirety. On-line program guide systems are described, for example, in Boyer et al. U.S. patent application Ser. No. 08/938,028, filed Sep. 18, 1997, which is hereby incorporated by reference herein in its entirety.

Figure 1:
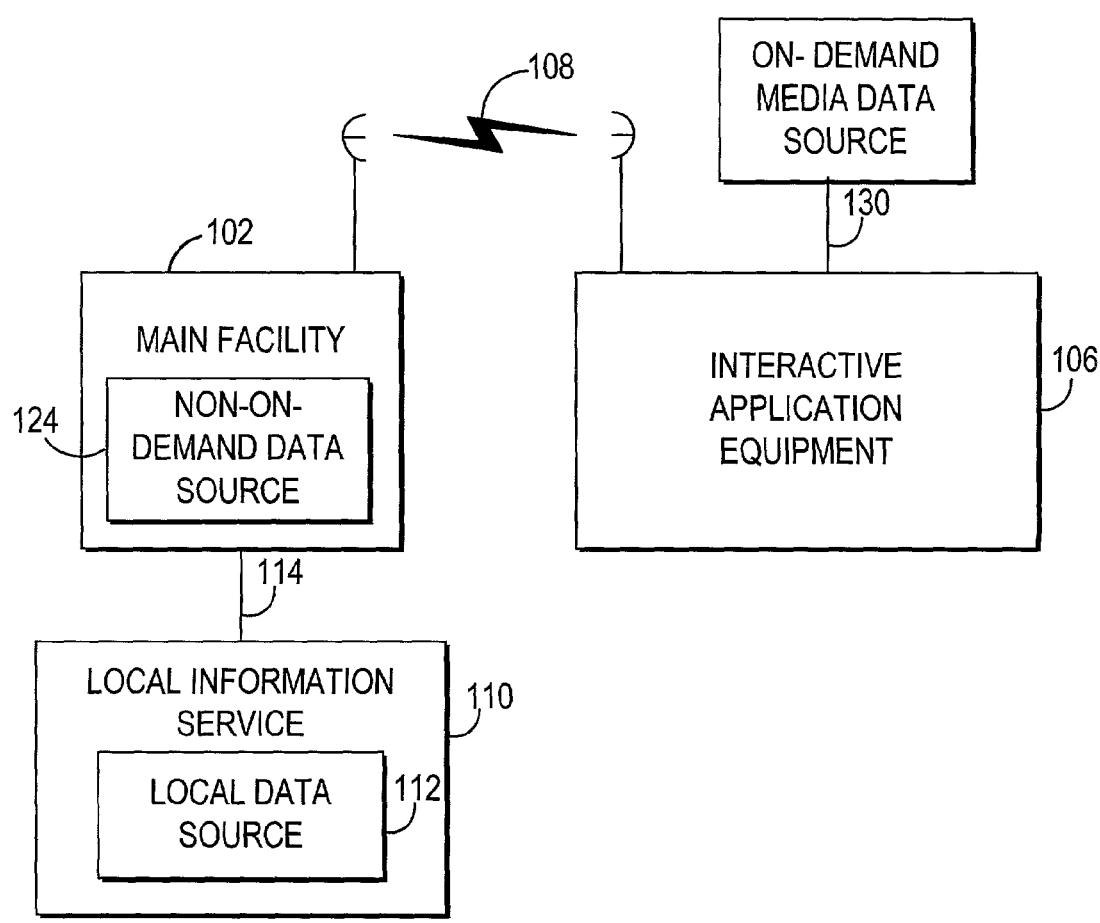
FIG. 1 is a schematic block diagram of an illustrative interactive television system, in accordance with various embodiments of the present invention.

An illustrative system 100 in accordance with one embodiment of the present invention is shown in FIG. 1. Main facility 102 may provide non-on-demand media data from non-on-demand media data source 124 to interactive application equipment 106 via communications path 108. Non-on-demand data source 124 of main facility 102 may be any suitable computer or computer-based system for generating, storing, or obtaining non-on-demand media data (e.g., manually from an operator, electronically via a computer network or other connection, or via storage media) and putting the data into electronic form for distribution by main facility 102. In some embodiments, non-on-demand media data source 124 may provide application data in addition to the non-on-demand media data. In other embodiments, main facility 102 may have multiple data sources for providing on-demand media data, non-on-demand media data, and other application data.

In some embodiments, application data sources may be located at facilities separate from main facility 102, such as at local information service 110, and have their media data provided to main facility 102 via communications path 114 for localization and distribution. Local information service 110 may contain local data source 112. Local data source 112 may be any suitable computer or computer-based system for generating, storing, or obtaining local information data (e.g., manually from an operator, electronically via a computer network or other connection, or via storage media) and putting the data into electronic form for distribution by main facility 102.

Local information service 110 may be any facility suitable for obtaining data particular to a localized region and providing the data to main facility 102 over communications path 114. Local information data may include, for example, local advertisements, local sports information, local news information, or other suitable local information. Local information service 110 may be, for example, a local weather station that measures weather data, a local newspaper that distributes local news information, or any other suitable provider of information. Main facility 102 may aggregate the program guide data and local information data and distribute them to interactive television equipment 106.

Communication paths 108 and 114 may be satellite communications paths, fiber-optic paths, wired communications paths, coaxial cable paths, radio frequency paths, electromagnetic communications paths, microwave communications paths, lightwave paths, Internet paths, a combination of such paths, or any suitable communication paths. Video signals may also be transmitted over paths 108 and 114 if desired.

Main facility 102 may transmit non-on-demand media data and other application data to interactive application equipment 106 using any suitable approach. For example, main facility 102 may distribute non-on-demand media data periodically, continuously, or with any other suitable frequency. In some approaches, media data may be distributed as files, packets, or as a data stream. Systems in which data is transmitted from a main facility to television distribution facilities using such an approach are described, for example, in Gollahon et al. U.S. patent application Ser. No. 09/332,624, filed Jun. 11, 1999, which is hereby incorporated by reference herein in its entirety. There may be numerous pieces or installations of interactive application equipment 106, although only one is shown in FIG. 1 to avoid over-complicating the drawing.

On-demand media data source 128 may provide on-demand media data, such as video-on-demand information (e.g., titles of on-demand videos, genre information fo on-demand videos, additional information for on-demand videos, and ordering information), audio-on-demand information (e.g., titles of on-demand audio media, additional information for on-demand audio media, and ordering information), interactive video game or other application information, stock market information, weather information, sports scores, sports statistics, or other suitable on-demand media information, to interactive application equipment 106 over communications link 130. On-demand media data source 128 may be any suitable computer or computer-based system for generating, storing, or obtaining such on-demand media data (e.g., manually from an operator, electronically via a computer network or other connection, or via storage media) and putting the data into electronic form for distribution. On-demand media data source may also provide on-demand media, such as on-demand videos, audio media, or application software.

Communication path 130 may be a satellite communications path, fiber-optic path, wired communications path, coaxial cable path, radio frequency path, electromagnetic communications path, microwave communications path, lightwave path, Internet path, a combination of such paths, or any suitable communication path. On-demand media may be provided over path 130.

In other embodiments, on-demand media data may be provided to main facility 102 for transmission to interactive application equipment 106. For example, on-demand media data may be generated at an on-demand media data source (not shown), transmitted to main facility 102, and transmitted to distribution facility 116 (illustrated in FIGS. 2-6) of interactive application equipment 106 via communications path 108.

An interactive television application may be implemented on interactive application equipment 106. Illustrative arrangements for interactive application equipment 106 are shown in FIGS. 2-6.

Figure 2:
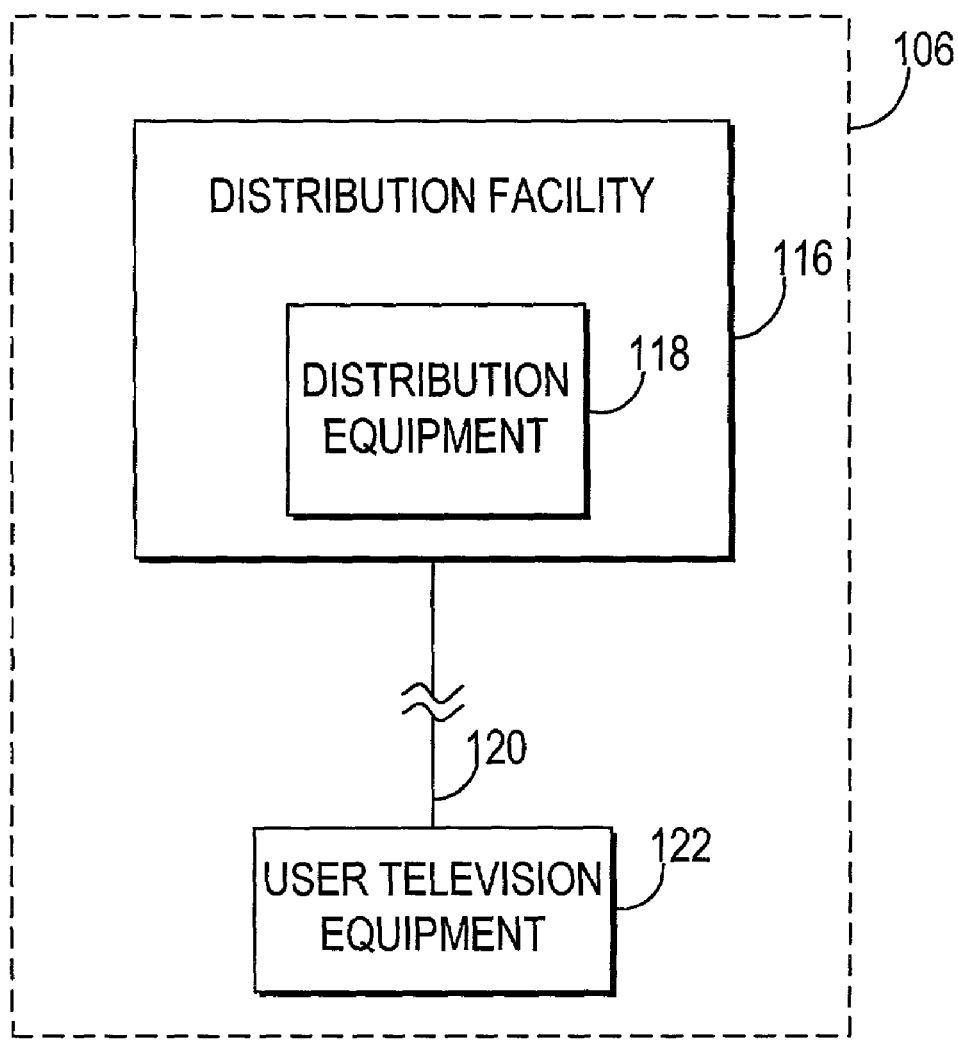
FIGS. 2-6 show illustrative arrangements for the interactive television application equipment of FIG. 1, in accordance with various embodiments of the present invention.
Figure 3:
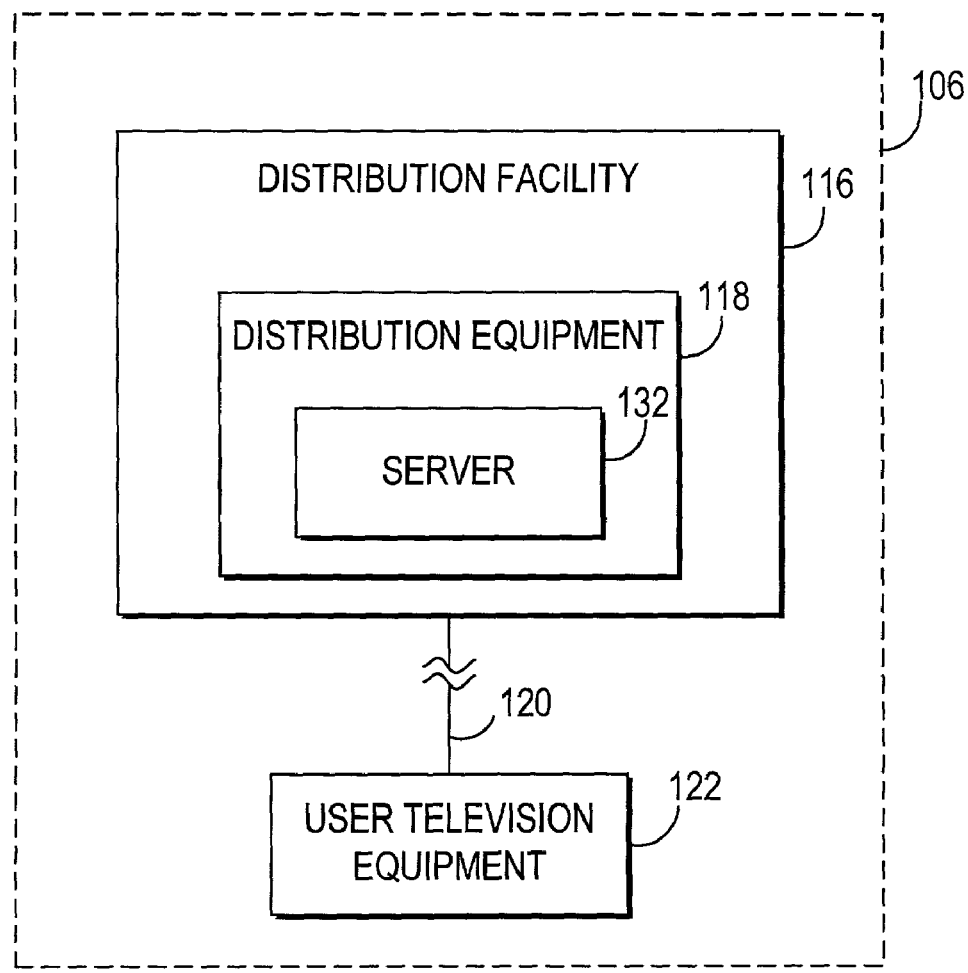
Figure 4:
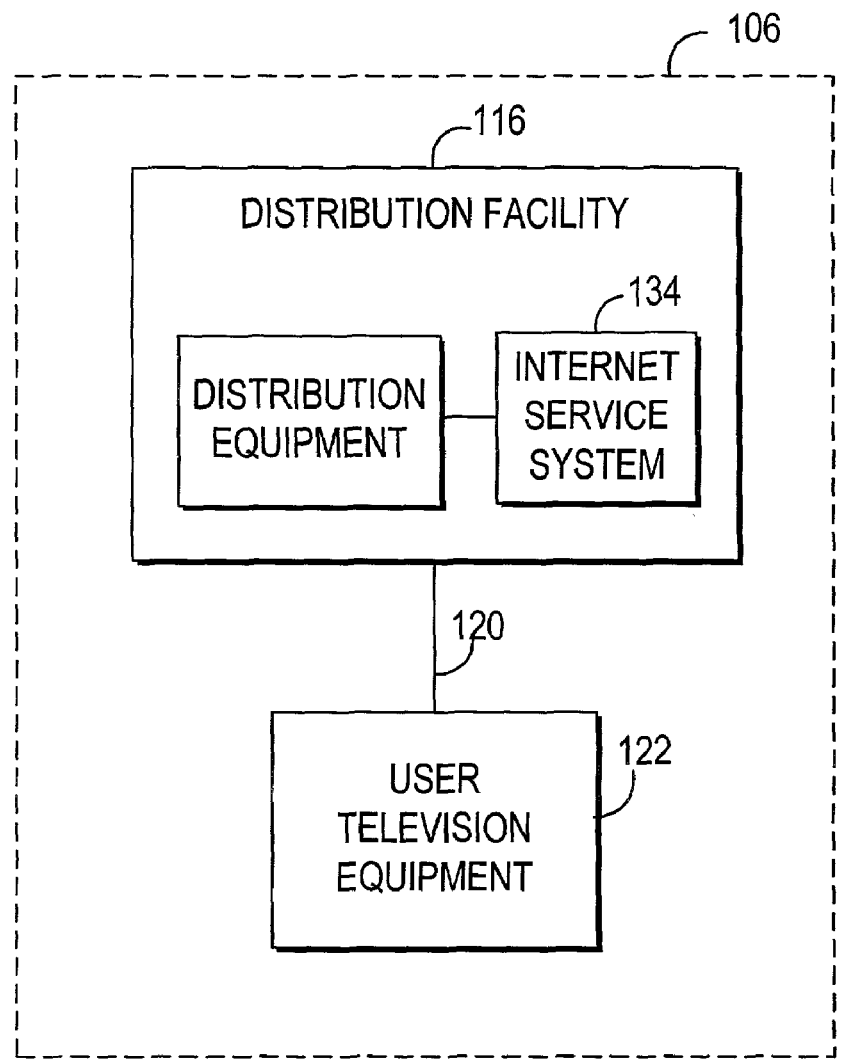
Figure 5:
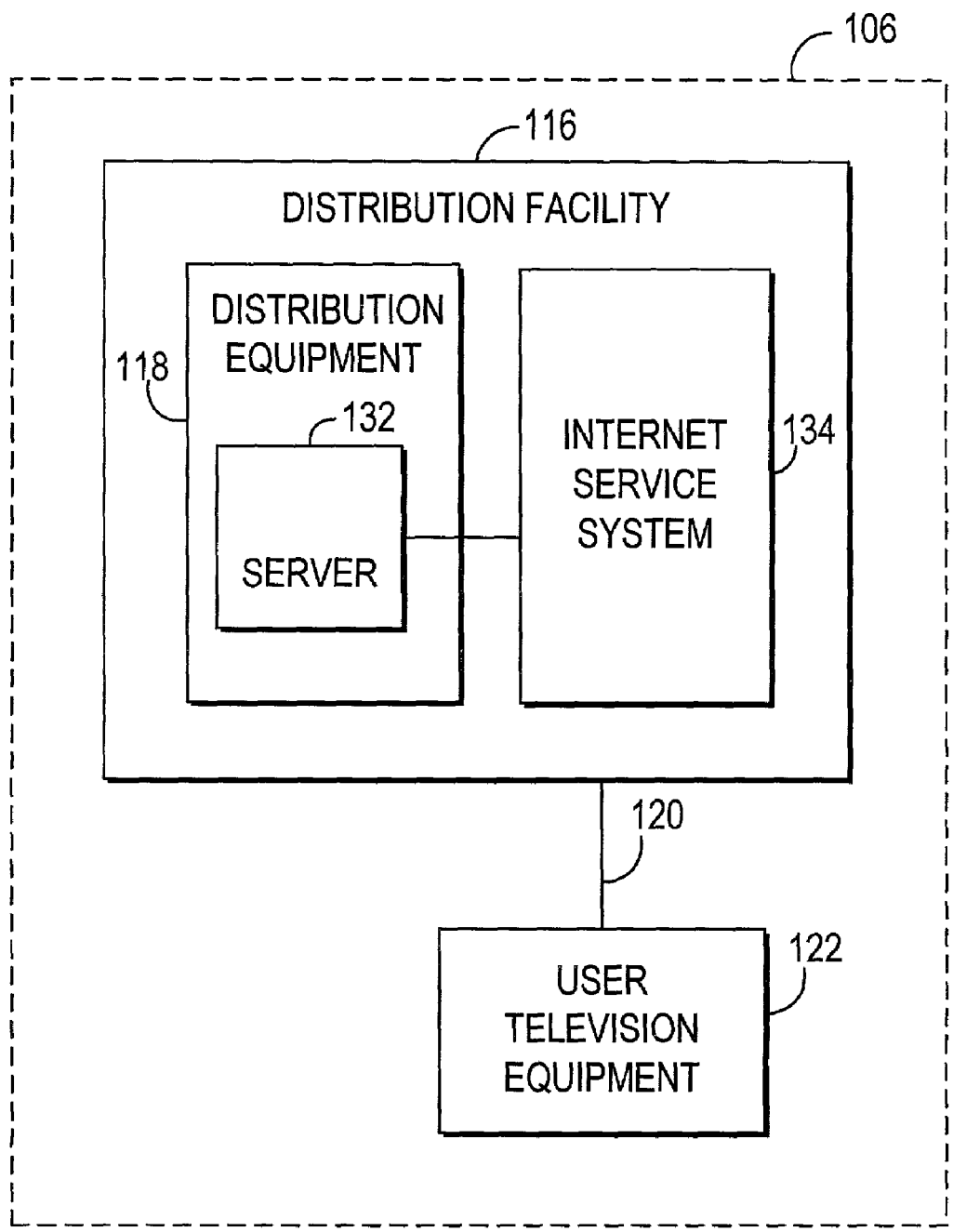

The interactive television application, such as an interactive television program guide, other guidance application, web browser, or other suitable interactive television application, may run on user television equipment 122 using the arrangements of FIG. 2 or FIG. 4, or may run partially on user television equipment 122 and partially on other components of interactive application equipment 106 using a suitable client-server or distributed processing arrangement such as those shown in FIG. 3 or FIG. 5. Distribution facility 116, illustrated in FIGS. 2-6, may be any suitable distribution facility (e.g., a cable system headend, a satellite distribution facility, a broadcast distribution facility, or any other suitable type of distribution facility), and may have distribution equipment 118. Typically, numerous distribution facilities 116 may be included in FIGS. 2-6.

Figure 6:
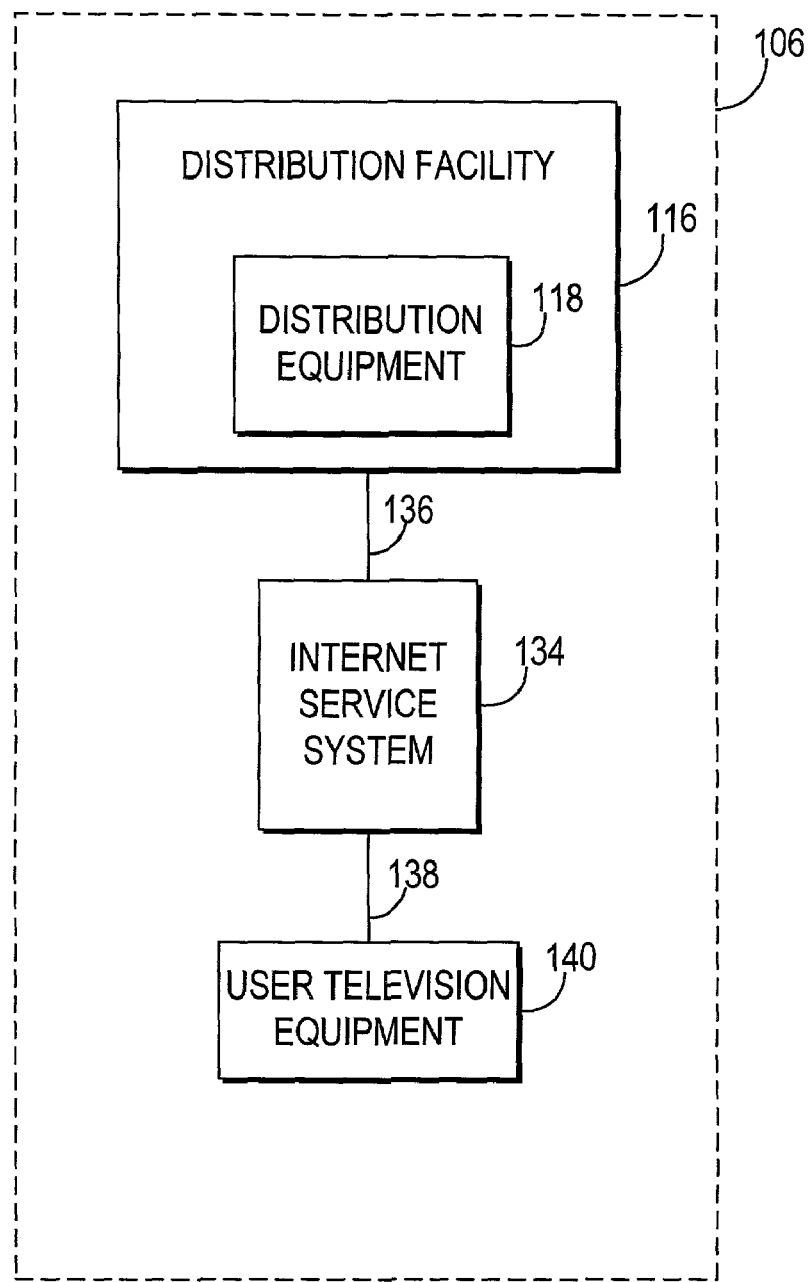

Distribution equipment 118 of FIGS. 2-6 may be equipment suitable for providing media data (i.e., on-demand media data and non-on-demand media data) and other application data to user television equipment 122 over communications path 120. In FIG. 6, distribution equipment 118 may provide media data, such as program guide data, to personal computer 140 via Internet service system 134 and suitable communications paths 136 and 138.

Distribution equipment 118 of FIGS. 2-6 may include, for example, suitable transmission hardware for distributing media data and other application data on a television channel sideband, in the vertical blanking interval of a television channel, using an in-band digital signal, using an out-of-band digital signal, or by any other suitable data transmission technique. Analog or digital signals for non-on-demand media and on-demand media (e.g., television programs, on-demand movies, on-demand music, etc.) may also be distributed by distribution equipment 118 to user television equipment 122 over communication path 120 on multiple television channels.

In some embodiments, media information may be provided as synchronous metadata. Synchronous metadata is data that is distributed to user television equipment 122 in FIGS. 2-5 or personal computer 140 of FIG. 6 logically at the same time as the media with which it is associated. For example, the synchronous metadata may be supplied contemporaneously with the non-on-demand or on-demand media, or prior to the media data but with information associating it with the data (e.g., identifiers, paths, or any other suitable information). The metadata may be provided in-band, out-of-band, using a carousel-based approach, using a client-server based approach, using localized caching, using a combination of these approaches, or using any other suitable approach.

The metadata may include other types of data. The metadata distributed to user television equipment 122 of FIGS. 2-5 or personal computer 140 of FIG. 6 may include, for example, commands that indicate to the user's in-home equipment (or client applications running on the equipment) that a particular action is to be performed (e.g., overlaying a visual indicator onto the on-demand media). The metadata may include a directory that indicates segments of on-demand media data. In some approaches, the metadata may be used as markers within the non-on-demand or on-demand media data. For example, the data may include actor interviews, trailers, selected scenes in a movie, music videos, or any other suitable media data segments. The data segments may be provided along with non-on-demand or on-demand data. Synchronous metadata that is distributed to interactive television applications is described, for example, in U.S. provisional patent application No. 60/239,521, filed Oct. 11, 2000, which is hereby incorporated by reference in its entirety.

Communication path 120 of FIGS. 2-5 and communication paths 136 and 138 of FIG. 6 may have sufficient bandwidth to allow distribution facility 116 or another distribution facility to distribute television programming to user television equipment 122 of FIGS. 2-5 or personal computer 140 of FIG. 6. There are typically multiple pieces of user television equipment 122 associated with communication paths 120 in FIGS. 2-5, although only one piece of user television equipment 118 and communication path 120 are shown in FIGS. 2-5 to avoid over-complicating the drawings. Similarly, there may be multiple personal computers 140 and multiple associated communication paths (FIG. 6), although only one personal computer 140 and communication path 138 are shown in FIG. 6 to avoid over-complicating the drawings. If desired, non-on-demand media data and on-demand media data may be provided over separate communication paths.

FIG. 3 illustrates an arrangement for interactive application equipment 106 in a client-server based or distributed interactive application system. The illustrated client-server based or distributed interactive application systems of FIG. 3 may process non-on-demand media data, on-demand media, data, any suitable combination thereof, or any other suitable data. In some embodiments, non-on-demand media data source 124 (FIG. 1) may be a server that provides non-on-demand media data via communication paths 108 (FIG. 1) and 120 (FIG. 2) to an application client implemented on user television equipment 122 (FIG. 3-5). Distribution equipment 118, as shown in FIG. 3, may include server 132. Server 132 may use any suitable combination of hardware and software to provide a client-server based application. Server 132 may, for example, run a suitable database engine (e.g., SQL Server by Microsoft) and provide non-on-demand data, on-demand data, or a combination thereof to an application client implemented on user television equipment 122. For example, server 132 may request or otherwise receive on-demand media data from on-demand media data source 128 (FIG. 1). In other approaches, user television equipment may request or otherwise receive on-demand media data from on-demand media data source 128 (FIG. 1). If desired, server 132 may be located at main facility 102, or other location, such as a cable system headend, a broadcast distribution facility, a satellite television distribution facility, or any other suitable type of television distribution facility.

An application client may retrieve application data from server 132 using any suitable client-server based approach. The client may, for example, pass SQL (structured query language) requests as messages to server 132. In another suitable approach, the application client may invoke remote procedures that reside on server 132 using one or more remote procedure calls. Server 132 may execute SQL statements for such invoked remote procedures. In another suitable approach, client objects executed by the application may communicate with server objects executed by server 132 using, for example, an object request broker (ORB).

FIGS. 4-5 show illustrative Internet-based interactive television application systems. As shown in FIG. 4, distribution facility 116 may, for example, include Internet service system 134. Internet service system 134 may be any suitable combination of hardware and software capable of providing application data to the application using an Internet based approach (e.g., the HyperText Transfer Protocol (HTTP)). If desired, Internet service system 134 may be located at a facility that is separate from distribution facility 116, as shown in FIG. 5.

In embodiments where the interactive television application is implemented on user television equipment 122 of interactive application equipment 106 as illustrated in FIG. 4, Internet service system 134 (or other suitable equipment at distribution facility 116 that is connected to Internet service system 134) may provide non-on-demand media data, on-demand media data and other application data to user television equipment 122 via the Internet, or via distribution equipment 118 using any suitable Internet-based approach (e.g., using the HyperText Transfer Protocol (HTTP) over a Transmission Control Protocol/Internet Protocol (TCP/IP) type path). In embodiments where the interactive television application implemented on interactive application equipment 106 is a client-server based application as shown in FIG. 5, server 132 may obtain on-demand media data and other application data from Internet service system 134. The application may also, however, obtain application data from Internet service system 134 via an Internet connection. In other embodiments, non-on-demand media data source 124, on-demand media data source 128, or a combination thereof may provide media data or other application data to user television equipment via Internet service system 134.

In another suitable arrangement, distribution equipment 118 may include computer equipment or other suitable hardware on which a first portion or version of the interactive television application is implemented. A second portion or version of the application may be implemented on user television equipment 122. The two versions or portions of the interactive television application may communicate using any suitable peer-to-peer communications scheme (e.g., messaging, remote function calls, etc.) and perform interactive application functions distributively between distribution facility 116 and user television equipment 122.

Another suitable arrangement in which an on-line application, such as an on-line program guide, may be implemented is on interactive application equipment 106 as shown in FIG. 6. On-line program guide systems are described, for example, in Boyer et al. U.S. patent application Ser. No. 08/938,028, filed Sep. 18, 1997, which is hereby incorporated by reference herein in its entirety. The user may have personal computer 140 on which an application client or web browser is implemented. Personal computer 140 may be connected to Internet service system 134 via path 138, and distribution facility 116 may be connected to Internet service system 134 via path 136. Internet service system 134 may be a communications network or a computer network and may use any suitable combination of computer hardware and software capable of providing an on-line server application or web site. Internet service system 134 is shown as obtaining application data from distribution facility 116. In other suitable approaches, Internet service system 134 may obtain information from other systems such as, for example, main facility 102 (FIG. 1), local information service 110 (FIG. 1), non-on-demand media data source 124 (FIG. 1), on-demand media data source 128 (FIG. 1), or any other suitable source of application data.

Figure 7:
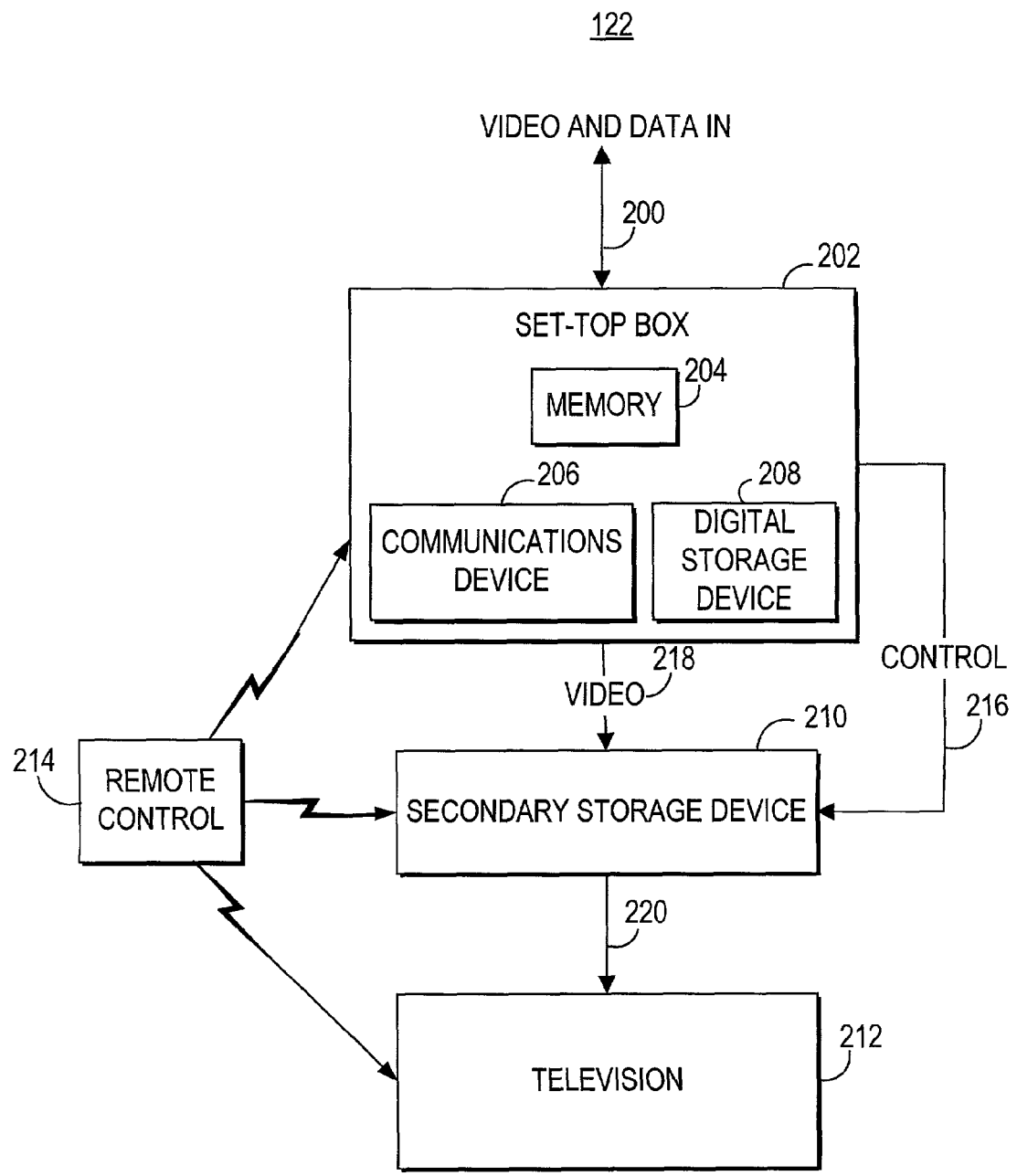
FIG. 7 is an illustrative schematic block diagram of the user television equipment of FIGS. 2-6, in accordance with various embodiments of the present invention.

An illustrative arrangement for user television equipment 122 is shown in FIG. 7. In some embodiments, user television equipment 122 may receive video or a digital video stream and data from distribution facility 116 (FIGS. 2-6), such as a program distribution facility or some other suitable distribution facility, at input 200. In some embodiments, user television equipment 122 may receive video or a digital video stream and data directly from main facility 102 (FIG. 1). In some embodiments, user television equipment 122 may receive non-on-demand media data from non-on-demand media data source 124 (FIG. 1), on-demand data from on-demand media data source 128 (FIG. 1), or any combination thereof. In still other embodiments, non-on-demand media data, on-demand media data, or a combination thereof may be transmitted from a plurality of media data sources to distribution facility 116 (FIGS. 2-6), which may transmit the non-on-demand data and the on-demand data to user equipment 122.

During normal television viewing, a user may tune set-top box 202 to a desired television channel. The signal for that television channel may then provided at video output 218. The signal supplied at output 218 is typically either a radio-frequency (RF) signal on a predefined channel (e.g., channel 3 or 4), or an analog demodulated video signal, but may also be a digital signal provided to television 212 on an appropriate digital bus (e.g., a bus using the Institute of Electrical and Electronics Engineers (IEEE) 1394 standard (not shown)). The video signal at output 218 may be received by optional secondary storage device 210.

The interactive television application may run on set-top box 202, television 212 (if television 212 has suitable processing circuitry and memory), a suitable analog or digital receiver connected to television 212, or digital storage device 208 if digital storage device 208 has suitable processing circuitry and memory. The interactive television application may also run cooperatively on a suitable combination of these devices. Interactive television application systems in which a cooperative interactive television program guide application runs on multiple devices are described, for example, in Ellis U.S. patent application Ser. No. 09/186,598, filed Nov. 5, 1998, which is hereby incorporated by reference herein in its entirety.

Secondary storage device 210 may be any suitable type of analog or digital program storage device or player (e.g., a videocassette recorder (VCR), a personal video recorder (PVR), a digital versatile disc (DVD) player, etc.). Program recording and other features may be controlled by set-top box 202 using control path 216. If secondary storage device 210 is a videocassette recorder or a personal video recorder, for example, a typical control path 216 may involve the use of an infrared transmitter coupled to the infrared receiver in the recorder that normally accepts commands from a remote control such as remote control 214. Remote control 214 may be used to control set-top box 202, secondary storage device 210, and television 212.

At least a portion of on-demand data may be cached in memory 204. In some embodiments, non-on-demand media data and other application data may also be cached in memory 204.

If desired, a user may record programming (e.g., movies, television programs, sporting events, any combination thereof, etc.) in digital form on digital storage device 208. Digital storage device 208 may be a writeable optical storage device (such as a DVD player capable of handling recordable DVD discs), a magnetic storage device (such as a disk drive or digital tape), or any other digital storage device. Interactive television program guide systems that have digital storage devices are described, for example, in Hassell et al. U.S. patent application Ser. No. 09/157,256, filed Sep. 17, 1998, which is hereby incorporated by reference herein in its entirety. Digital storage device 208 may cache on-demand media data.

Digital storage device 208 may be contained in set-top box 202 or it can be an external device connected to set-top box 202 via an output port and appropriate interface. If necessary, processing circuitry in set-top box 202 formats the received video, audio and data signals into a digital file format. The file format may be an open file format such as the Moving Picture Experts Group (MPEG) MPEG-2 standard or the Moving Joint Photographic Experts Group (MJPEG) standard. The resulting data may be streamed to digital storage device 208 via an appropriate bus (e.g., a bus using the Institute Electrical and Electronics Engineers (IEEE) 1394 standard), and stored on digital storage device 208. In another suitable approach, an MPEG-2 data stream or series of files may be received from distribution equipment 122 (FIGS. 2-6) and stored.

Television 212 may receive video signals from secondary storage device 210 via communications path 220. The video signals on communications path 220 may either be generated by secondary storage device 210 when playing back a prerecorded storage medium (e.g., a videocassette or a recordable digital video disc), by digital storage device 208 when playing back a pre-recorded digital medium, may be passed through from set-top box 202, may be provided directly to television 212 from set-top box 202 if secondary storage device 210 is not included in user television equipment 122 (FIGS. 2-5), or may be received directly by television 212. During normal television viewing, the video signals provided to television 212 may correspond to the desired channel to which a user has tuned with set-top box 202. Video signals may also be provided to television 212 by set-top box 202 when set-top box 202 is used to play back information stored on digital storage device 208.

Set-top box 202 may have memory 204. Memory 204 may be any memory or other storage device, such as a random access memory (RAM), read only memory (ROM), flash memory, a hard disk drive, a combination of such devices, or any memory suitable for storing application instructions and application data for use by the interactive application. At least a portion of non-on-demand data, on-demand data, or a combination thereof may be automatically cached in memory 204. Caching on-demand media data may reduce or eliminate the latency in displaying on-demand media data on television 212, and may reduce the resource load of a distribution network, depending on the chosen system implementation.

Set-top box 202 may have communications device 206 for communicating directly with distribution equipment 118 (FIGS. 2-6), server 132 (FIGS. 3 and 5) Internet service system 134 (FIGS. 4-6) or, in some embodiments, non-on-demand media data source 124 (FIG. 1) or on-demand media data source 128 (FIG. 1), over a suitable communication paths. Communications device 206 may be a modem (e.g., cable modem, telephone modem, digital subscriber line (DSL) modem, integrated service digital network (ISDN) modem, or any suitable analog or digital modem), network interface card (e.g., an Ethernet card, etc.), or other suitable communications device. Communications device 206 may also be a personal computer with an Internet connection in, for example, the arrangement shown in FIG. 6. Television 212 may also have such a suitable communications device if desired. In an alternative approach, user television equipment 122 (FIGS. 4-5) may communicate with Internet service system 134 (FIGS. 4-5) via distribution equipment 118 using a suitable return path.

Figure 8:
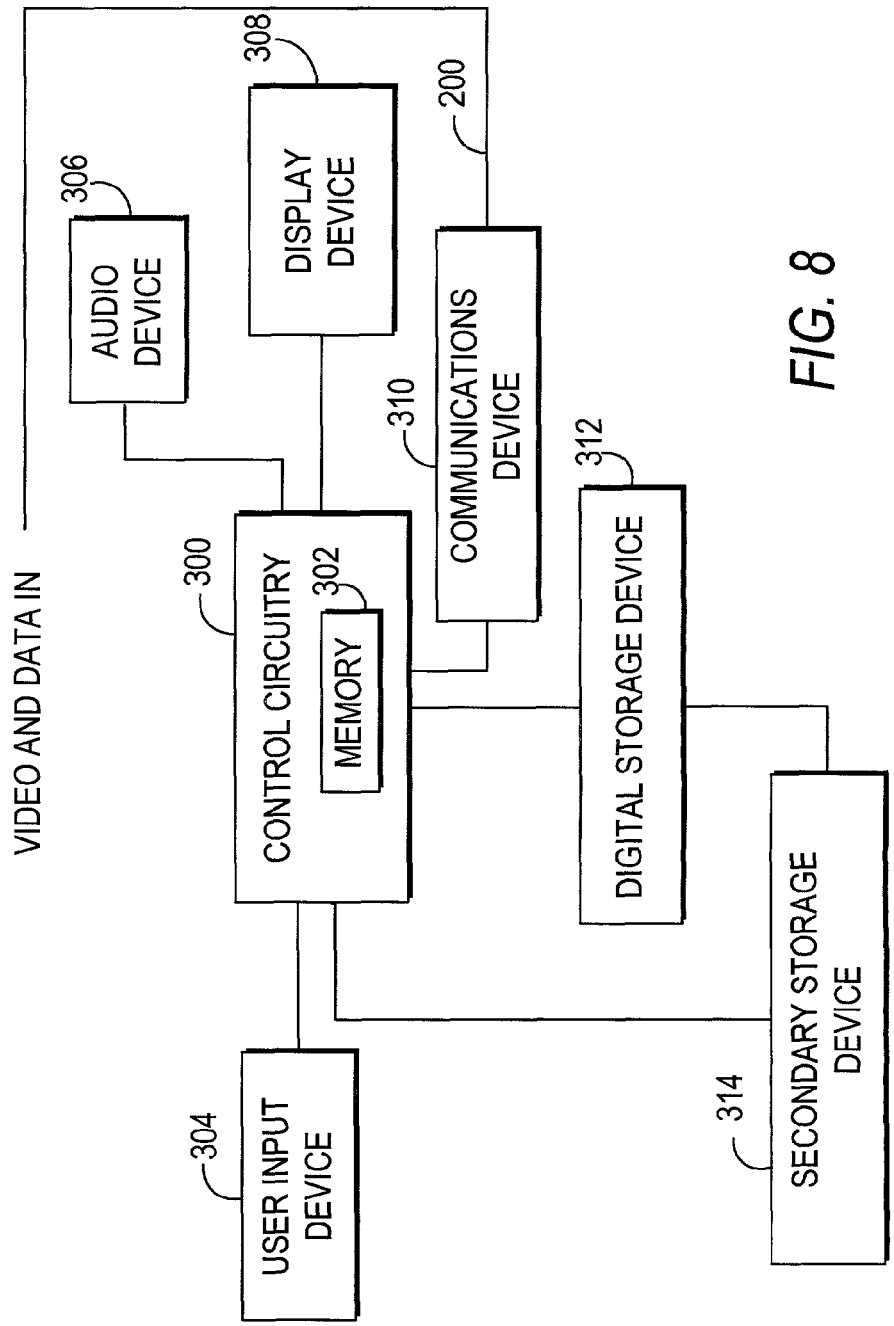
FIG. 8 is a illustrative schematic block diagram of portions of the illustrative user television equipment of FIG. 7, in accordance with various embodiments of the present invention.

FIG. 8 is a illustrative schematic block diagram of portions of the user television equipment of FIG. 7, in accordance with various embodiments of the present invention. Application data 200 from distribution facility 116 (FIGS. 2-6) may be received by control circuitry 300 of user television equipment 122 (FIGS. 2-5) or personal computer 140 (FIG. 6). The functions of control circuitry 300 may be integrated into an advanced television receiver, personal computer television (PC/TV), or any other suitable arrangement. If desired, a combination of such arrangements may be used.

User television equipment 122 of FIG. 8 may also have digital storage device 312 and secondary storage device 314 for recording media. Secondary storage device 314 may be any suitable type of analog or digital program storage device (e.g., a videocassette recorder (VCR), a personal video recorder (PVR), a digital versatile disc (DVD), etc.). Program recording and other features may be controlled by control circuitry 300. Digital storage device 312 may be, for example, a writeable optical storage device (such as a DVD player capable of handling recordable DVD discs), a magnetic storage device (such as a disk drive or digital tape), or any other digital storage device. In some embodiments, digital storage device 312 may cache on-demand media data.

User television equipment 122 may also have memory 302. Memory 302 may be any memory or other storage device, such as a random access memory (RAM), read only memory (ROM), flash memory, a hard disk drive, a combination of such devices, etc., that is suitable for storing application instructions and application data for use by control circuitry 300. Memory 302 may also store cached on-demand media data for use by the interactive television application.

User television equipment 122 of FIG. 8 may also have communications device 310 for supporting communications between equipment 122 and distribution equipment 118 (FIGS. 2-6), server 132 (FIGS. 3 and 5), Internet service system 134 (FIGS. 4-6) or, in some embodiments on-demand media data source 124 (FIG. 1) or non-on-demand media source 128 (FIG. 1) via suitable communication paths. Communications device 310 may be a modem (e.g., a cable modem, digital subscriber line (DSL) modem, telephone modem, integrated services digital network (ISDN) modem, or any suitable analog or digital modem), network interface card (e.g., an Ethernet card, Token ring card, etc.), or other suitable communications device.

A user may control the operation of user television equipment 122 with user input device 304. User input device 304 may be a pointing device, wireless remote control, keyboard, touch-pad, voice recognition system, or any other suitable user input device. To watch television, a user instructs control circuitry 300 to display a desired television channel on display device 308. Display device 308 may be any suitable television, monitor, or other suitable display device. To access the functions of the application, a user may instruct the application to generate a main menu or other desired display for display on display device 308. To access sound, a user may instruct control circuitry 300 to provide audio media on audio device 306. Audio device 306 may be part of display device 308, or may be separate.

Figure 9:
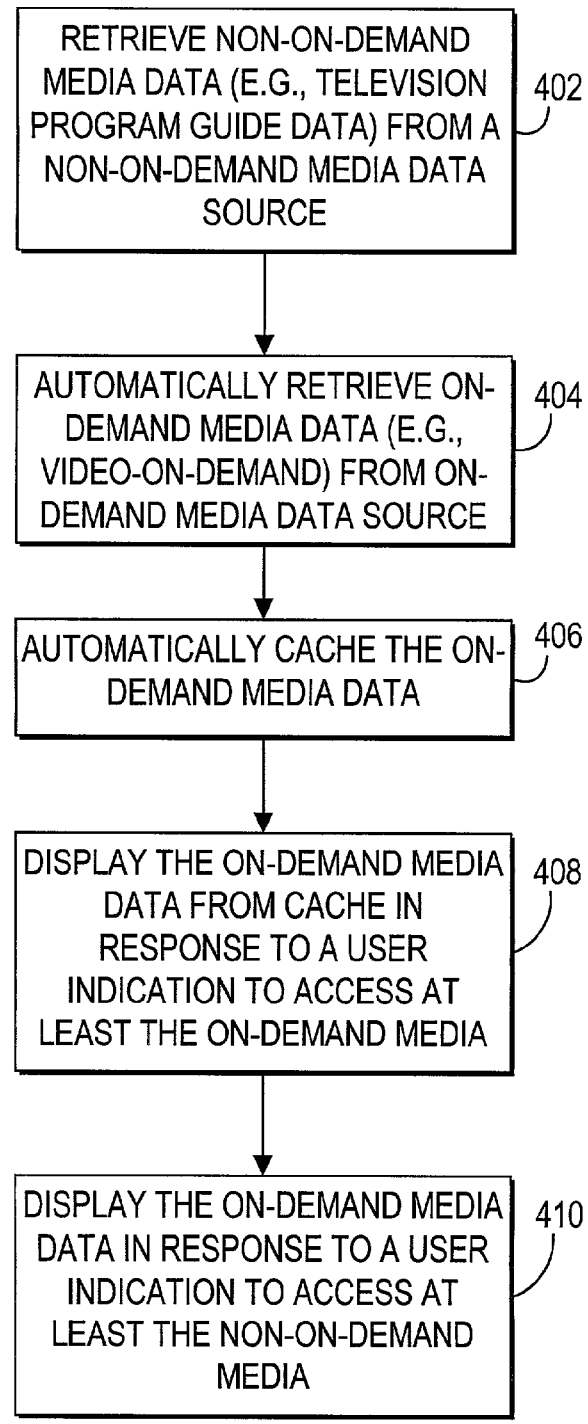
FIG. 9 is a flow diagram illustrative of retrieving, caching, and displaying non-on-demand and on-demand data from different data sources in accordance with various embodiments of the present invention.

FIG. 9 is a flow diagram illustrating process 400 for retrieving and caching data from multiple data sources in accordance with certain aspects of the present invention. As shown, non-on-demand data may be retrieved from a non-on-demand media data source at step 402. For example, in some embodiments an interactive television application may retrieve non-on-demand data from non-on-demand media data source 124 (FIG. 1) directly or via distribution facility 116 (FIGS. 2-6) and suitable communications paths. It may not be necessary for user equipment 122 (FIGS. 2-5) or personal computer 140 (FIG. 6) to request non-on-demand data from a data source. Rather, a non-on-demand media data source may periodically send non-on-demand data to user television equipment 122 (FIGS. 2-5) or personal computer 140 (FIG. 6). In some embodiments, non-on-demand data may also be stored in cache memory.

On-demand media data may be automatically retrieved from an on-demand media data source at step 404. For example, user television equipment 122 may retrieve on-demand data from non-on-demand media data source 124 (FIG. 1) directly or via distribution facility 116 and suitable communications paths. It may not be necessary for user equipment 122 to request on-demand data from a data source. Rather, an on-demand media data source may periodically send on-demand data to user television equipment 122 or distribution facility 116.

The on-demand media data may be automatically cached on user television equipment after retrieval from the on-demand media data source at step 406. On-demand media information may be cached, for example, in memory 204 (FIG. 7) or memory 302 (FIG. 8) or digital storage device 208 or 312. Caching the on-demand media data may be staggered in time among users to lessen the peak loads on the network which distributes the on-demand media data. For example, distribution facility 116 (FIGS. 2-6) may distribute cache schedules from non-on-demand media data source 124 (FIG. 1) or on-demand media data source 128 (FIG. 1) to user television equipment 122 (FIGS. 2-5) or personal computer 140 (FIG. 6) that indicate to the interactive television application when on-demand media data is to be cached. In some embodiments, on-demand media data may be predictively cached in order to further reduce latencies. For example, on-demand media data which is commonly accessed, or which is likely to be accessed by the user, such as features accessible to a user from a given display, may be cached. In other approaches, the most popular media on demand data may be cached. In still other approaches, the data that is cached may be personalized. For example, user activity may be monitored and the on-demand media may be cached based on the user history. Any other suitable predictive caching may be used.

At step 408, the on-demand media data may be retrieved from cache and displayed in response to a user indication to access at least the on-demand media. For example, on-demand media data may be provided in a display with only on-demand media data, such as a video-on-demand listings display. In other approaches, on-demand media data may be displayed with non-on-demand media data, other application data, or any suitable combination thereof.

Non-on-demand media data may be displayed in response to a user indication to access at least the non-on-demand data at step 410. For example, non-on-demand media data may be provided in a display with only non-on-demand media data, such as a television program listings display. In other approaches, non-on-demand media data may be displayed with on-demand media data, other application data, or any suitable combination thereof.

Figure 10:
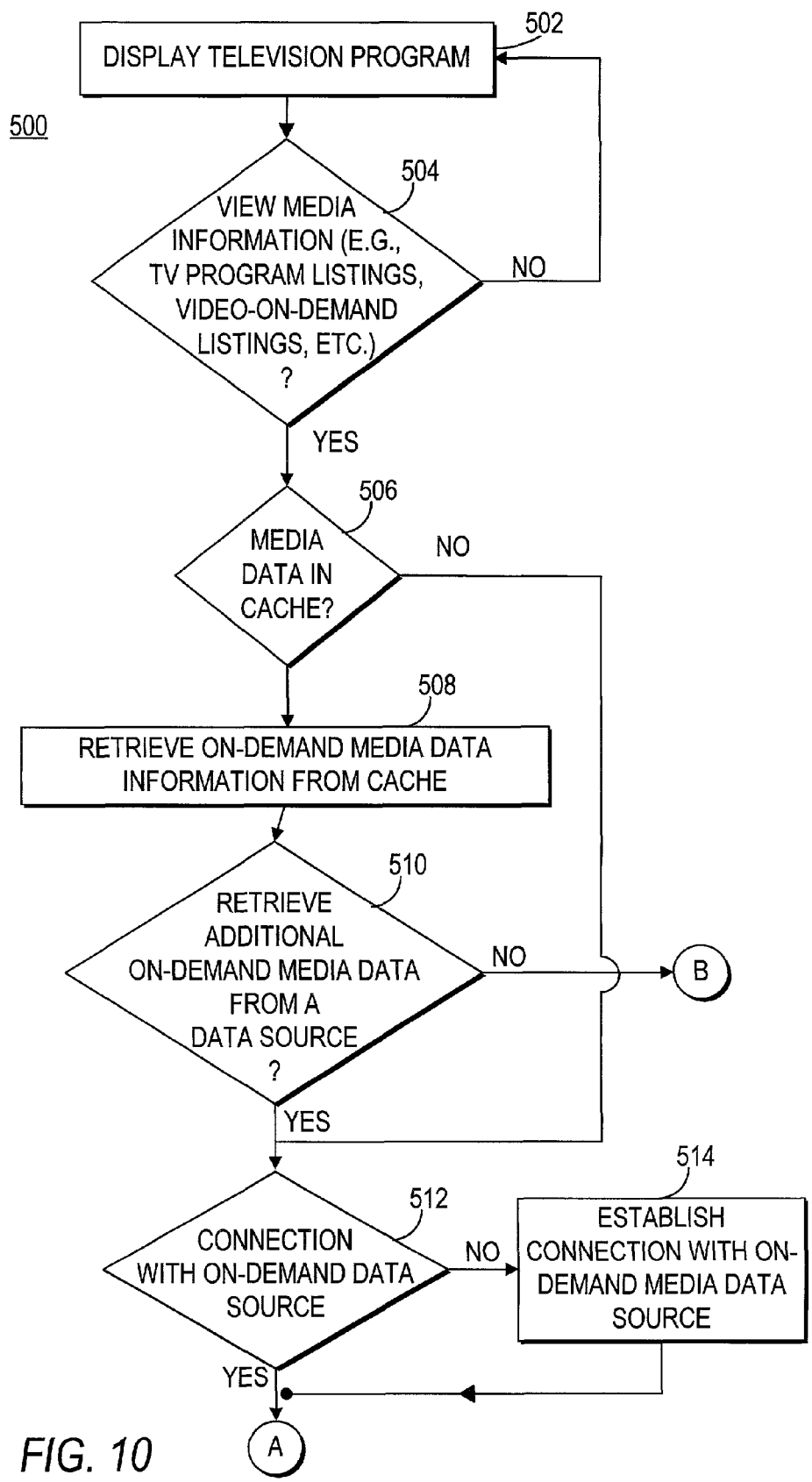
FIGS. 10-11 are more detailed flow diagrams of FIG. 9 illustrative of retrieving, caching, and displaying non-on-demand and on-demand data from different data sources in accordance with various embodiments of the present invention.
Figure 11:
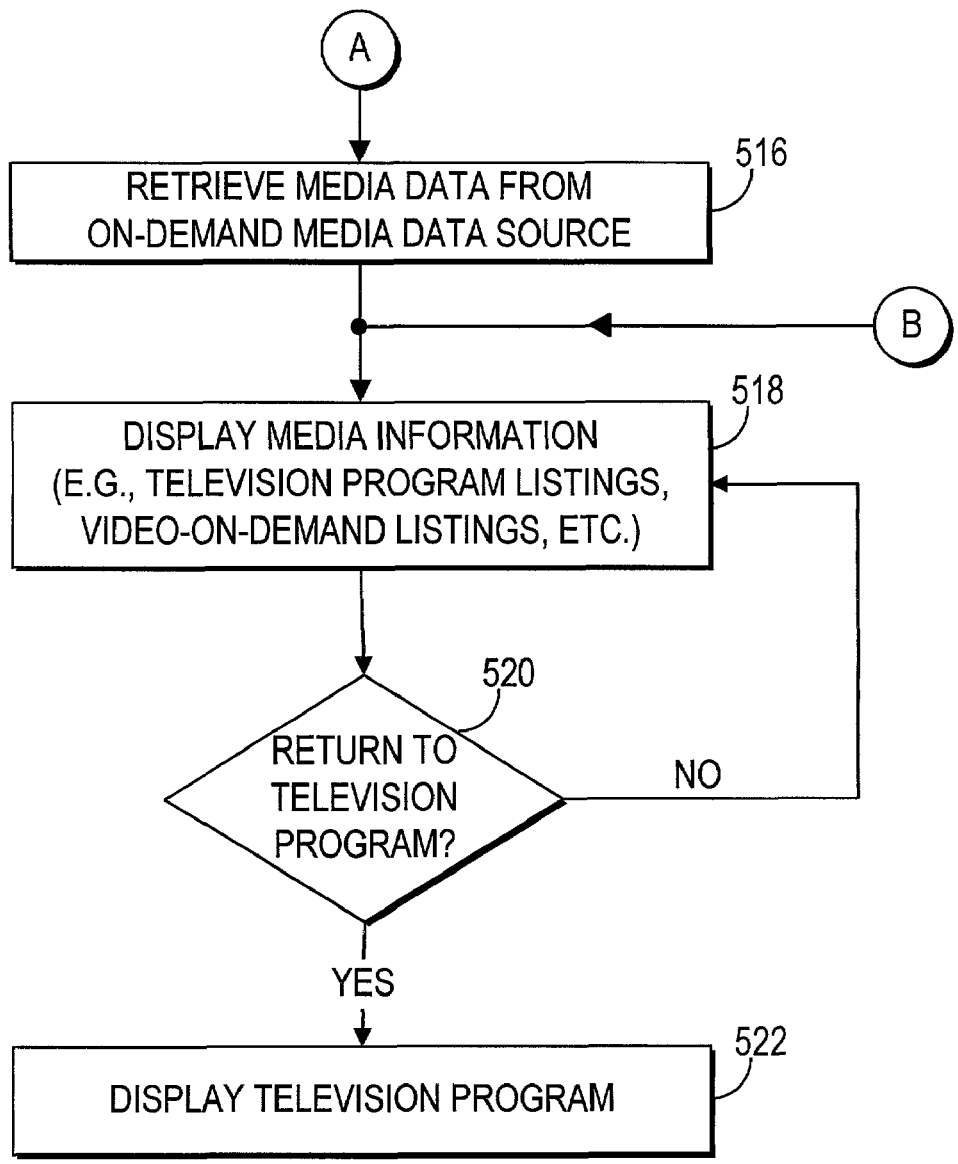

FIGS. 10-11 are flow diagrams illustrating process 500 for providing non-on-demand data and on-demand data in accordance with various embodiments of the present invention. Display television program step 502 may display television programming, for example, on user television equipment 122 (FIGS. 2-5) or personal computer 140 (FIG. 6). In some embodiments, equipment 122 (FIGS. 2-5) may continually check for user input (e.g., commands from remote control 214 illustrated in FIG. 7). View media information test 504 may determine whether a user has indicated to have the interactive television application display media information. Media information may be non-on-demand media offerings, on-demand media offerings, a combination thereof, or any suitable media information. If the user does not select to enter the interactive television application, the television program will continue to be displayed at step 502. If the user does select an option to view media information at test 504, an interactive television application menu may be displayed (e.g., display 600 illustrated in FIG. 12).

After a user has selected to view media information, test 506 may determine whether the corresponding media data is in located in the cache of the interactive television application system (e.g., memory 204, digital storage device 208, secondary storage device 210, etc. illustrated in FIG. 7). In some embodiments, the media data stored in cache may be on-demand media data. If the requested data is not in the cache, step 512 may determine whether a connection exists between the interactive television application system (e.g., user television equipment 122 illustrated in FIGS. 2-5) and a data source (e.g., distribution facility 116, non-on-demand media data source 124, on-demand media data source 128, etc. illustrated in FIGS. 1-6) that may provide the requested media data. If it is determined at test 506 that the requested media data is in cache, the data may be retrieved at step 508. In some embodiments, media data that is commonly accessed, or likely to be accessed, may be cached to minimize latency in displaying the media data and reducing the load on transmission system resources. For example, on-demand media data for features accessible to a user from a given display may be cached. In other approaches, the most popular media on demand data may be cached. In still other approaches, the data that is cached may be personalized. For example, user activity may be monitored and the on-demand media may be cached based on the user history. Any other suitable predictive caching may be used.

Next, test 510 may determine whether it is necessary to retrieve additional media data from a data source (e.g., non-on-demand media data source 124 or on-demand media data source 128 (FIG. 1)) in order to display the media data requested by the user. In some embodiments, the media data to be retrieved may be on-demand media data. In some embodiments, media data that is commonly accessed, or likely to be accessed, may be retrieved to minimize latency in the display of media data. If it is determined that media data does not need to be retrieved, the requested media data (e.g., television program listings, video-on-demand listings, interactive video game listings, audio-on-demand listings, weather information, etc.) may be displayed or otherwise provided to the user at step 518.

If it is determined that media data needs to be retrieved from a data source, test 512 may determine whether a connection between the interactive television application system (e.g., user equipment 122 illustrated in FIGS. 2-5, personal computer 140 illustrated in FIG. 6, etc.) and a data source (e.g., on-demand media data source 128 of FIG. 1) has been established. A connection may be established at step 514 if there is no pre-existing connection. In some embodiments, communications device 206 (FIG. 7) may be used to establish a connection between user television equipment 122 and distribution facility 116 via a suitable communications path. After a connection has been established at step 514, media information may be retrieved from a data source at step 516 (FIG. 11), and displayed at step 518 (FIG. 11). In some embodiments, the retrieved information may be on-demand media data.

Test 520, as illustrated in FIG. 11, may continually check whether the user would like to return to the television program. In some embodiments, user television equipment 122 (FIGS. 2-5) may receive a user indication to return to television programming from remote control 214 as illustrated in FIG. 7. If the user does not wish to return to the television program, the media information may continue to be displayed at step 518. If the user does select to return to television programming, the television program may be displayed at step 522. In some embodiments, media information and television programming may be displayed at the same time.

Figure 12:
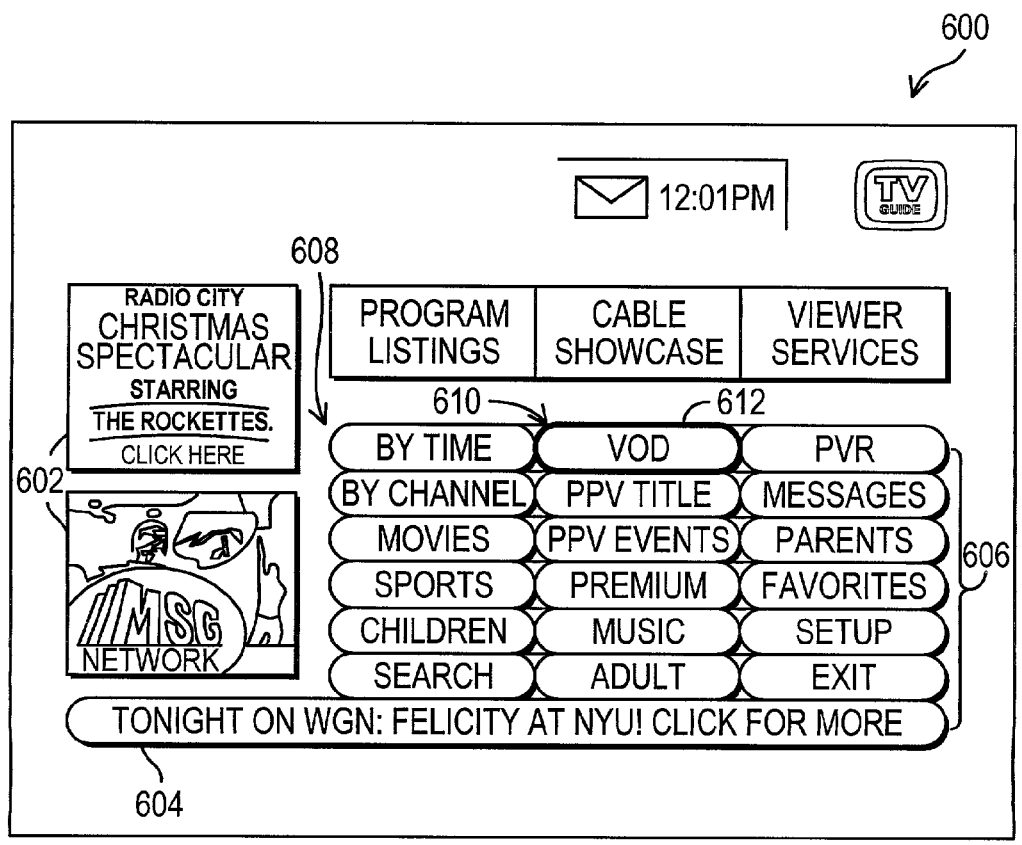
FIG. 12 shows an illustrative interactive television application menu display in accordance with various embodiments of the present invention.

FIG. 12 shows an illustrative a menu display 600 for an interactive guidance application in accordance with one embodiment of the present invention. As shown, display 600 may include panel advertisements 602, banner advertisement 604, viewer services options 606, program listings options 608, cable showcase options 610, and highlight region 612.

Panel advertisements 602 may be used to advertise, for example, programs, products or promotions to a user. In some embodiments, users may select panel advertisements 602 in order to obtain more information regarding the program, product or promotional offer. In some embodiments, advertisements 602 may also be targeted, for example, towards a user's viewing habits, selections, purchases, or by using any suitable targeting criteria. Panel advertisements may appear in displays illustrated in FIGS. 12-19.

Banner advertisement 604 may used to advertise, for example, a special event or promotion. In some embodiments, users may select banner advertisement 604 in order to obtain more information regarding the special event or promotion. In some embodiments, advertisement 604 may also be targeted, for example, towards a user's viewing habits, selections, purchases, or by using any suitable targeting criteria. Banner advertisements may appear in displays illustrated in FIGS. 12-19.

In response to a user selecting an advertisement 602 or 604 that promotes non-on-demand media or products, the interactive application may, for example, retrieve information for the program or product from memory by establishing a client/server session between user equipment 122 and non-on-demand media data source 122 (FIG. 1). In response to a user selecting an advertisement 602 or 604 that promotes on-demand media, the interactive application may, for example, determine whether data for the advertised on-demand media has been cached and, if so, retrieve information for the on-demand media from cache and provide it in a suitable display. When data for the advertised on-demand media is not cached, the interactive television application may, for example, establish a client/server session between user equipment 122 and on-demand media data source 122 (illustrated in FIG. 1) and retrieve data for display. The data for the on-demand media may have been cached based on a schedule for displaying the advertisement, may have been cached at the time the advertisement was displayed and made available for user selection, or based on any other suitable criteria.

Display 600 may also contain viewer services options 606. Suitable viewer services options 606 may include an option to access features or information of a personal video recorder, an option to access messages (e.g., e-mail messages, messages provided from television system service provider, etc.), an option to adjust parental control settings (e.g., blocked channels or ratings, etc.), an option to set favorites (e.g., favorite channels, etc.), an option to set up the program guide or user equipment, an option to exit display 600, or any suitable option.

Display 600 may also contain program listings options 608. Options 608 may include an option to view program listings organized by time, organized by channel, organized by genre (e.g., sports, children, etc.), or by any other suitable organization. Options 608 may also include an option to search for programs of interest (e.g., using keywords, based on a title search, based on an actor search, etc.).

Cable showcase options 610 may include, for example, video-on-demand program listings option, pay-per-view program listings option, pay-per-view event listings option, premium channel listings option, music channel listings option, adult program listings option, or any other suitable options.

Highlighted region 612 may be used to indicate a user's selection of an option in screen 600. In some embodiments of the invention, set top box 202 (FIG. 7) may receive a user command from remote control 214 (FIG. 7) to move highlighted region 612 within display 600 or within any of the displays illustrated in FIGS. 12-20.

Figure 13:
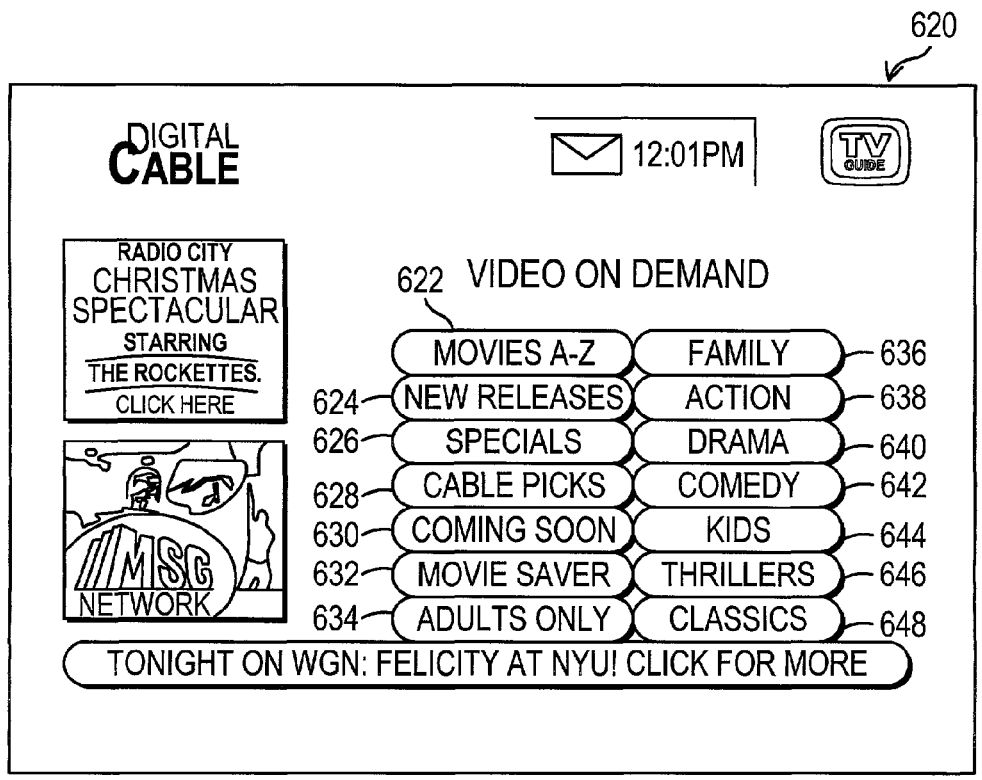
FIG. 13 shows an illustrative interactive television application video-on-demand display in accordance with various embodiments of the present invention.

In response to a user selecting the VOD (video-on-demand) option shown in display 600 of FIG. 12, the interactive guidance application may present the user with a display such as display 620 of FIG. 13. As shown, VOD display 620 may include various options that allow the user to view VOD program listings organized by different genres. The genre options may include: alphabetical movies listings option 622, new releases option 624, specials option 626, cable picks option 628, coming soon option 630, movie saver option 632, adults only option 634, family option 636, action option 638, drama option 640, comedy option 642, kids option 644, thrillers option 646, classics option 648, or any other suitable option. In some embodiments, the different genre options may be on-demand media data retrieved and cached from an on-demand data source (e.g., on-demand media data source 128 illustrated in FIG. 1). For example, the labels for display options and other related information may be cached when the user accesses display 600 (FIG. 12) or selects VOD option 612 (FIG. 12) or periodically or at other suitable times.

Figure 14:
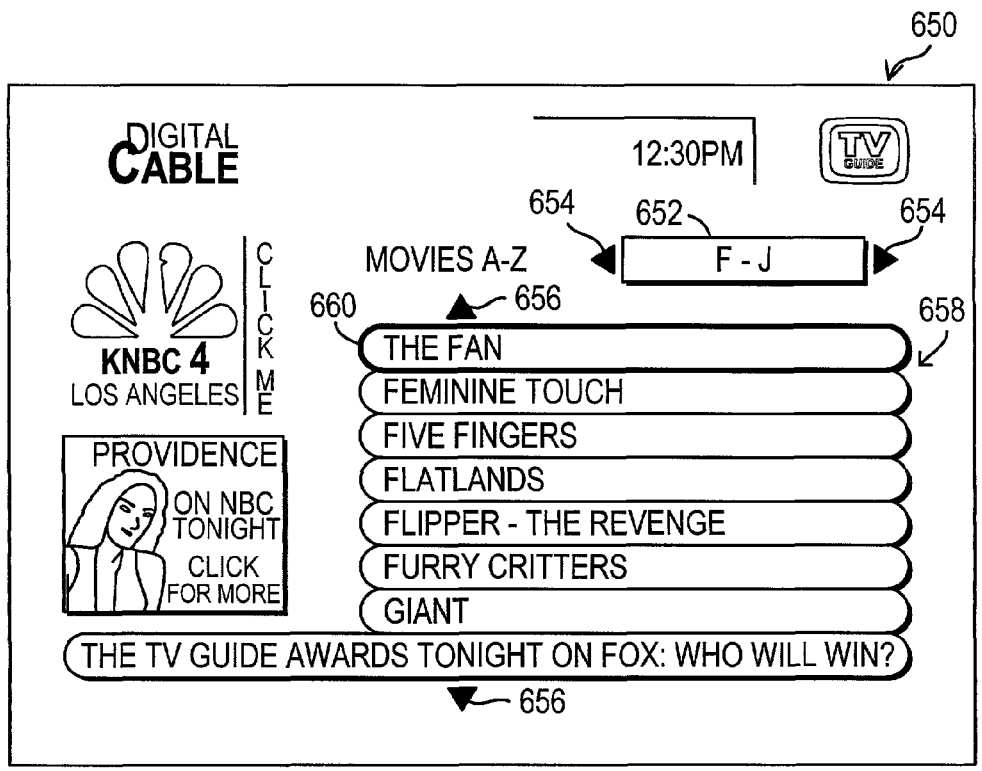
FIG. 14 shows an illustrative interactive television application video-on-demand alphabetical movie listings display in accordance with various embodiments of the present invention.
Figure 15:
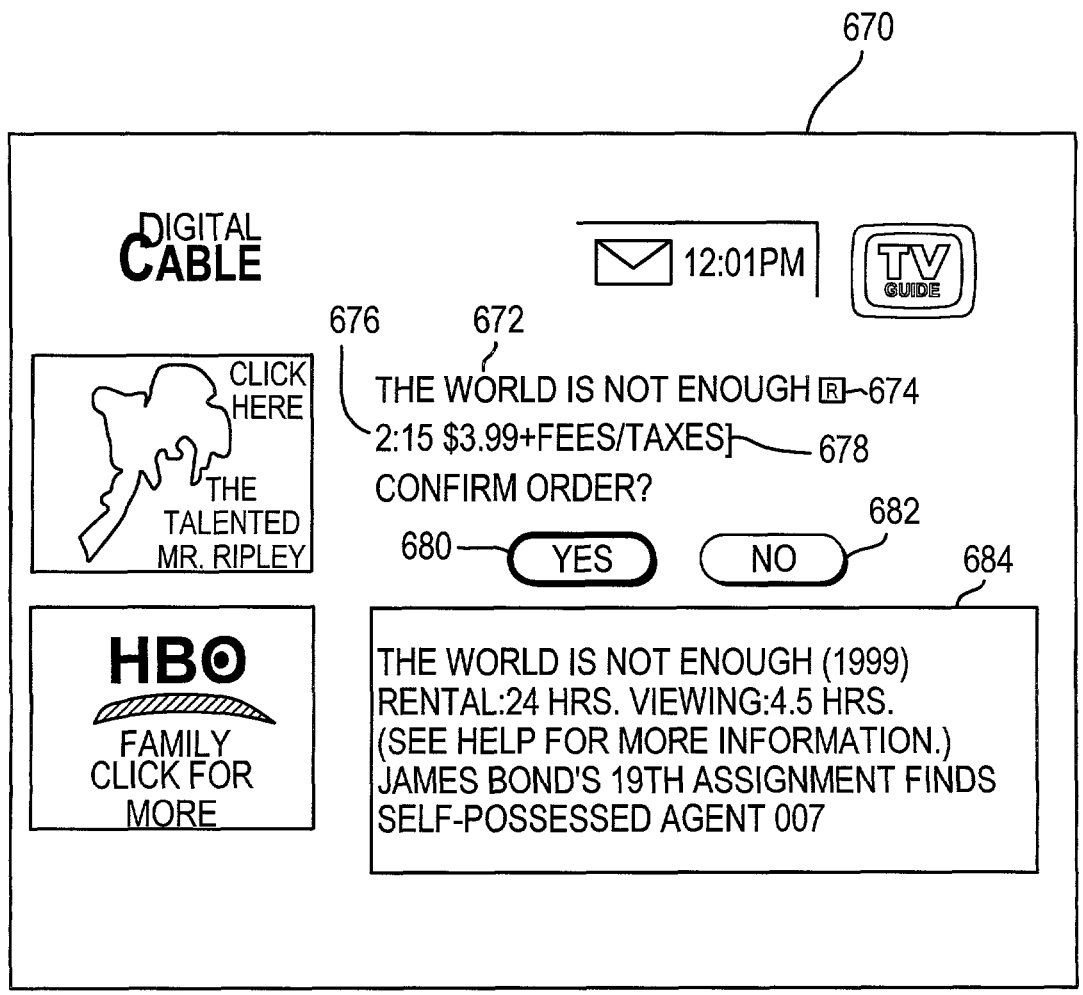
FIG. 15 shows an illustrative interactive television application video-on-demand individual movie information display in accordance with various embodiments of the present invention.

In response to the user selecting alphabetical movie listings option 622 of display 620 for example, the interactive television application may present display 650 of FIG. 14 in which video-on-demand options are listed alphabetically. As shown, display 650 may include alphabetical range display area 652, alphabetical range arrows 654, list arrows 656, movie listings 658, and highlighted region 660. During display generation, the interactive television application may examine its cache (e.g., memory 204 (FIG. 7) or memory 302 (FIG. 8)) to determine whether the necessary on-demand media data, in this example video-on-demand titles, has been cached. For example, if alphabetical movie title data is commonly accessed, or likely to be accessed, the interactive television application system may have retrieved and cached the data automatically when the user accessed display 620 (FIG. 13). In another example, the system may cache the first few titles (e.g., one page of listings) in each alphabetical range. When the data has been cached, the interactive television application may retrieve the information for display. Otherwise, the interactive television application may retrieve the on-demand media data from an on-demand media data source (e.g., on-demand media data source 128 (FIG. 1)).

The alphabetical range of movies covered by display 650 may be shown in region 652. In some embodiments, only a portion of the offerings for video-on-demand may be shown on display 650 as indicated by arrows 654. In some embodiments, set-top-box 202 (FIG. 7) may receive a user command from remote control 214 (FIG. 7) to navigate forwards or backwards in the alphabetical list. Similarly, set-top box 202 may receive a user command from remote control 214 to navigate though video-on-demand movie listings 658 of FIG. 14. In some embodiments, the system may retrieve and cache detailed information for each of the titles on the display, each time the display is updated to show a different set of on-demand titles. This may allow the system to display detailed information about the selection when the user selects it, without having to wait for data to be retrieved from on-demand media source.

The user may select an individual video-on-demand movie title from video-on-demand movie listings 658 using highlighted region 660. In some embodiments, a display for an individual video-on-demand movie, such as display 760 illustrated in FIG. 15, may be presented to the user. Display 670 of FIG. 15 may include title 672, which may be the title of the selected video-on-demand listing. Rating 674 may indicate to the user the rating for the selected video-on-demand movie (e.g., G, PG, PG-13, R, etc.). Run-time 676 may indicate the length of the video-on-demand selection in, for example, hours and minutes. Cost 678 may indicate the cost in viewing the video-on-demand selection. In some embodiments, a user may accept the costs and view the selected video-on-demand title by selecting yes button 680. Alternatively, the user may decline ordering the video-on-demand title by selecting no button 682. In some embodiments, the user may select an option to preview the video-on-demand selection (e.g., view a clip, trailer, or other promotional video segment) before making a purchasing decision. Information area 684 may provide information related to the video-on-demand selection, including the title, release date, rental period, viewing period, movie summary, actor/actress names, producer names, production studio name, or any other suitable information. In some embodiments, the information presented in display 670 may be retrieved from cache, such that the information related to the selection may be presented when the user selects it. The title, rating, cost, run-time, release date, rental period, viewing period, movie summary, actor/actress names, producer names, production studio name, or any other suitable information may be previously stored in cache and retrieved for display upon indication by the user to view an individual video-on-demand selection. Thus, the user may not experience delays that may be associated with having to retrieve the data from a on-demand media data source.

In some embodiments, the interactive television application system may combine video-on-demand program listings with television program listings on the same display. In display 700 of FIG. 16, for example, program listings 702 may be organized by time. The interactive television application may present display 700 in response to, for example, the user selecting the by time option from program listings options 608 (FIG. 12). During display generation process, the interactive television application may examine its cache (e.g., memory 204 (FIG. 7) or memory 302 (FIG. 8)) to determine whether the necessary on-demand media data, in this example video-on-demand titles 704, has been cached. For example, if listings for particular time slots are commonly accessed, or likely to be accessed, and if particular VOD titles are to be promoted for those time slots, the interactive television application system may have retrieved and cached the data automatically when the user accessed display 600 (FIG. 12) or when the user selected by time option 608 (FIG. 12) or at some previous time. When the data has been cached, the interactive television application may retrieve the information for display. Otherwise, the interactive television application may retrieve the on-demand media data from an on-demand media data source (e.g., on-demand media data source 128 (FIG. 1)). The non-on-demand media data for television program listings 706 may be retrieved from a non-on-demand media data source (e.g., non-on-demand media data source 124 (FIG. 1)).

Figure 16:
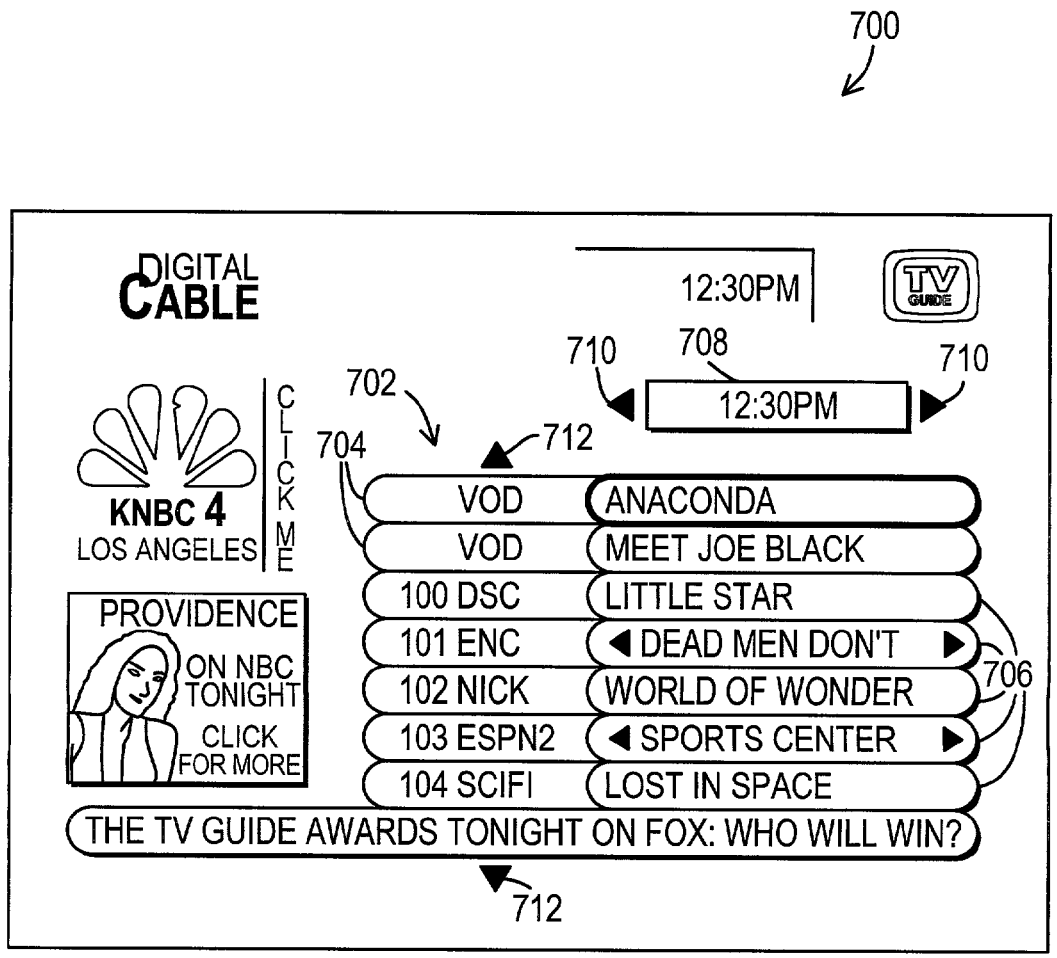
FIG. 16 shows an illustrative interactive television application display with video-on-demand listings and television program listings organized by time in accordance with various embodiments of the present invention.

In this example, non-on-demand program listings 706 correspond to programs that may be airing during the time indicated in area 708 (e.g., 12:30 PM in the example of FIG. 16). Arrows 710 may indicate to the user that program listings for other times may be available. In some embodiments, set-top box 202 (FIG. 7) may receive user commands from remote control 214 (FIG. 7) to scroll through listings offered at different times. Video-on-demand media indicated by program listings 704 may be available for on-demand viewing during the time indicated in area 708, or at any time in a true on-demand approach. The video-on-demand program listings may be provided in display 700 to promote these offerings.

More television program listings and video-on-demand program listings may be available than may fit on display 700.

Arrows 712 may indicate to the user that more listings are available by scrolling. In some embodiments, set-top box 202 (FIG. 7) may receive user commands from remote control 214 (FIG. 7) to scroll through the list of program listings 702. As the user scrolls through additional pages of listings for a time period or to listings for other time periods, additional non-on-demand listings and on-demand listings may be retrieved from the cache or retrieved from a remote server.

When screen 700, or any other screen shown in FIGS. 12-20, is displayed, the interactive television application may continue to play the audio track from the currently tuned television program or other non-on-demand or on-demand media. Alternatively, the interactive television application may reduce the size of the video track, and show it at the same time as any of the display screens. In another alternative, on-demand data or non-on-demand data may be overlaid on top of the video track. Opening a session with the on-demand media server or other server may require the interactive television application to use the tuner in the set-top, thus losing the audio or video. Therefore, it is highly desirable to retrieve data from the cache for the most common screens, and for any screens that simultaneously show video and listings. On screens that show both non-on-demand listings and on-demand listings, the user may not expect to lose the video connection, and also may be less willing to experience a delay to retrieve on-demand listings.

Figure 17:
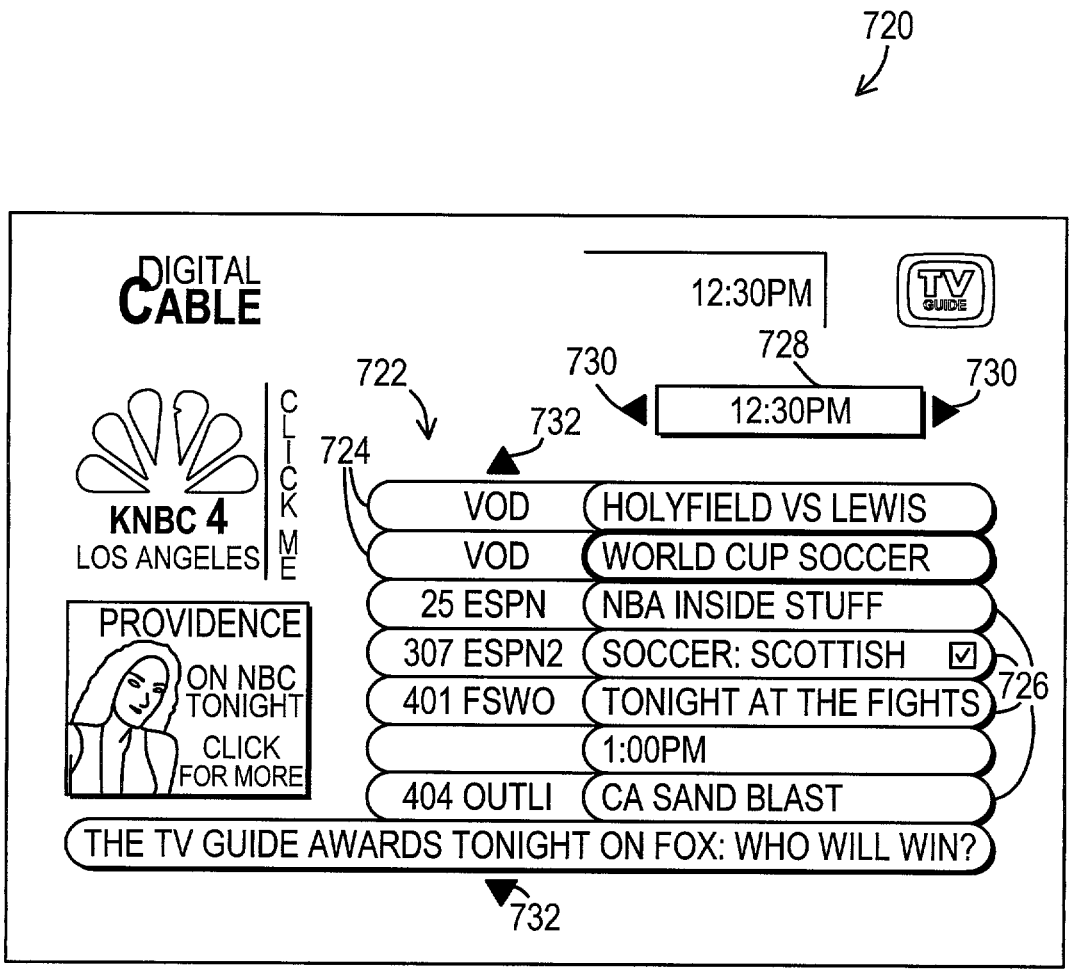
FIG. 17 shows an illustrative interactive television application display with video-on-demand listings and television program listings organized by the sports genre in accordance with various embodiments of the present invention.

FIG. 17 shows an illustrated interactive television application display 720 in which video-on-demand program listings 724 and television program listings 726 may be organized by the sports genre in accordance with one embodiment of the present invention. The interactive television application may display display 720 in response to the user selecting the sports option of program listings options 608 in display 600 of FIG. 12. During display generation process, the interactive television application may examine its cache (e.g., memory 204 (FIG. 7) or memory 302 (FIG. 8)) to determine whether the necessary on-demand media data, in this example video-on-demand titles 724, has been cached. For example, if listings for sports media are commonly accessed, or likely to be accessed, the interactive television application system may have retrieved and cached the data automatically when the user accessed display 600 (FIG. 12) or when the user selected sports option 608 (FIG. 12) or at other earlier time. When the data has been cached, the interactive television application may retrieve the information for display. Otherwise, the interactive television application may retrieve the on-demand media data from an on-demand media data source (e.g., on-demand media data source 128 (FIG. 1)). The non-on-demand media data for television program listings 726 may be retrieved from a non-on-demand media data source (e.g., non-on-demand media data source 124 (FIG. 1)) or the local cache.

Arrows 730 may indicate that a user may scroll through times to view program listings. In some embodiments, set-top box 202 (FIG. 7) may receive user commands from remote control 214 (FIG. 7) to scroll through program listings 722 for different times. In some embodiments, display 720 may not display all of the available television program listings 726 and video-on-demand listings 724. As indicated by arrows 732, a user may scroll through sports listings 722 for a given time displayed in time area 728. In some embodiments, set-top box 202 (FIG. 7) may receive user commands from remote control 214 (FIG. 7) to scroll through program listings 722.

Figure 18:
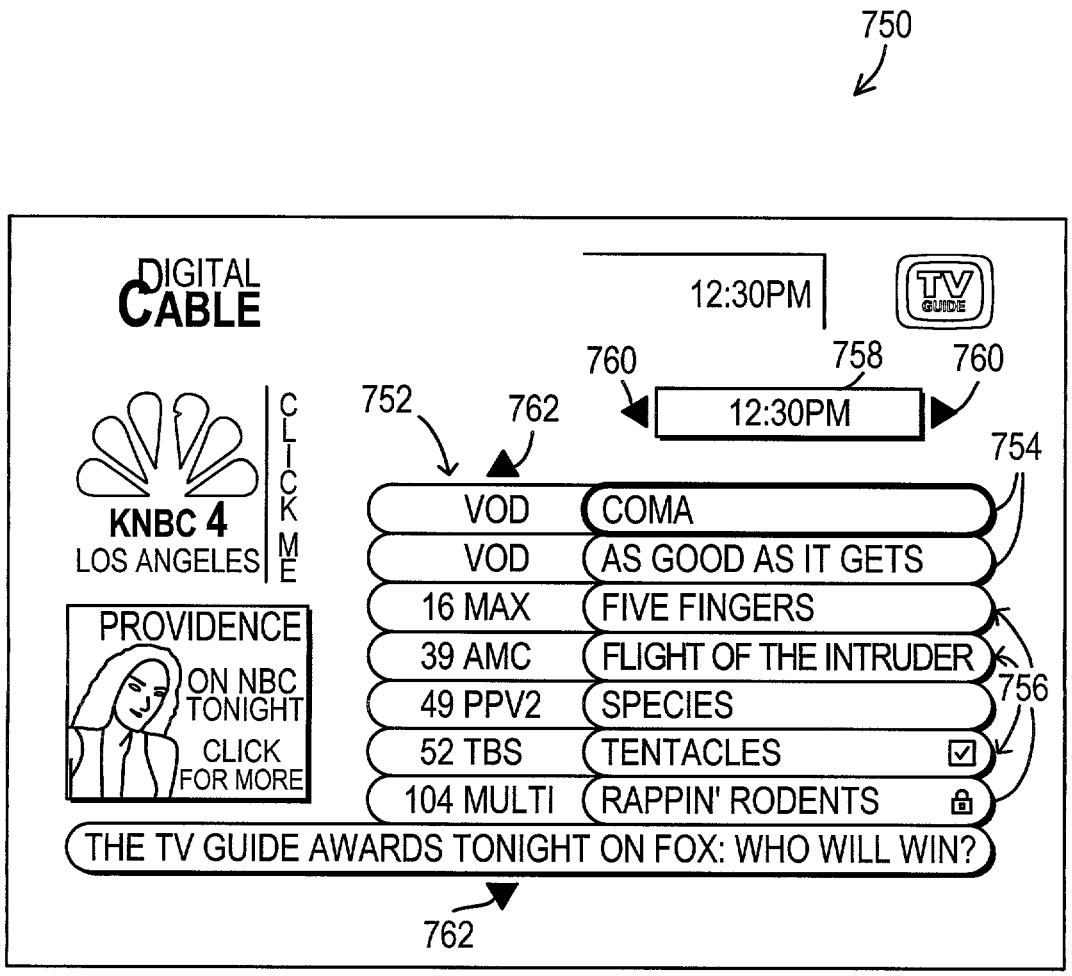
FIG. 18 shows an illustrative interactive television application display with video-on-demand listings and television program listings organized by the movie genre in accordance with various embodiments of the present invention.

FIG. 18 shows an illustrative interactive television application display 750 in which video-on-demand program listings 754 and television program listings 756 of combined listings 752 are organized by the movie genre in accordance with one embodiment of the present invention. The interactive television application may provide display 750 in response to, for example, the user selecting the movies option from program listings option 608 of display 600 of FIG. 12. During display generation process, the interactive television application may examine its cache (e.g., memory 204 (FIG. 7) or memory 302 (FIG. 8)) to determine whether the necessary on-demand media data, in this example video-on-demand titles 754, has been cached. For example, if listings for movies are commonly accessed, or likely to be accessed, the interactive television application system may have retrieved and cached the data automatically when the user accessed display 600 (FIG. 12) or when the user selected movie option 608 (FIG. 12) or at other earlier time. When the data has been cached, the interactive television application may retrieve the information for display. Otherwise, the interactive television application may retrieve the on-demand media data from an on-demand media data source (e.g., on-demand media data source 128 (FIG. 1)). The non-on-demand media data for television program listings 756 may be retrieved from a non-on-demand media data source (e.g., non-on-demand media data source 124 (FIG. 1)) or from the cache.

Combined listings 752 may be organized according to time. Area 758 may indicate the time that programs in combined listings 752 may be aired. Arrows 760 may indicate a user may scroll though times in order to view combined listings for different times. In some embodiments, set-top box 202 (FIG. 7) may receive user commands from remote control 214 (FIG. 7) to view combined listings 752 for different times indicated in area 758. In some embodiments, all available television program listings 756 and video-on-demand listings 754 may not be shown on display 750 for a given time shown in area 758. Arrows 762 may indicate that more listings are available. In some embodiments, set-top box 202 (FIG. 7) may receive user commands from remote control 214 (FIG. 7) to scroll through combined listings 752.

Figure 19:
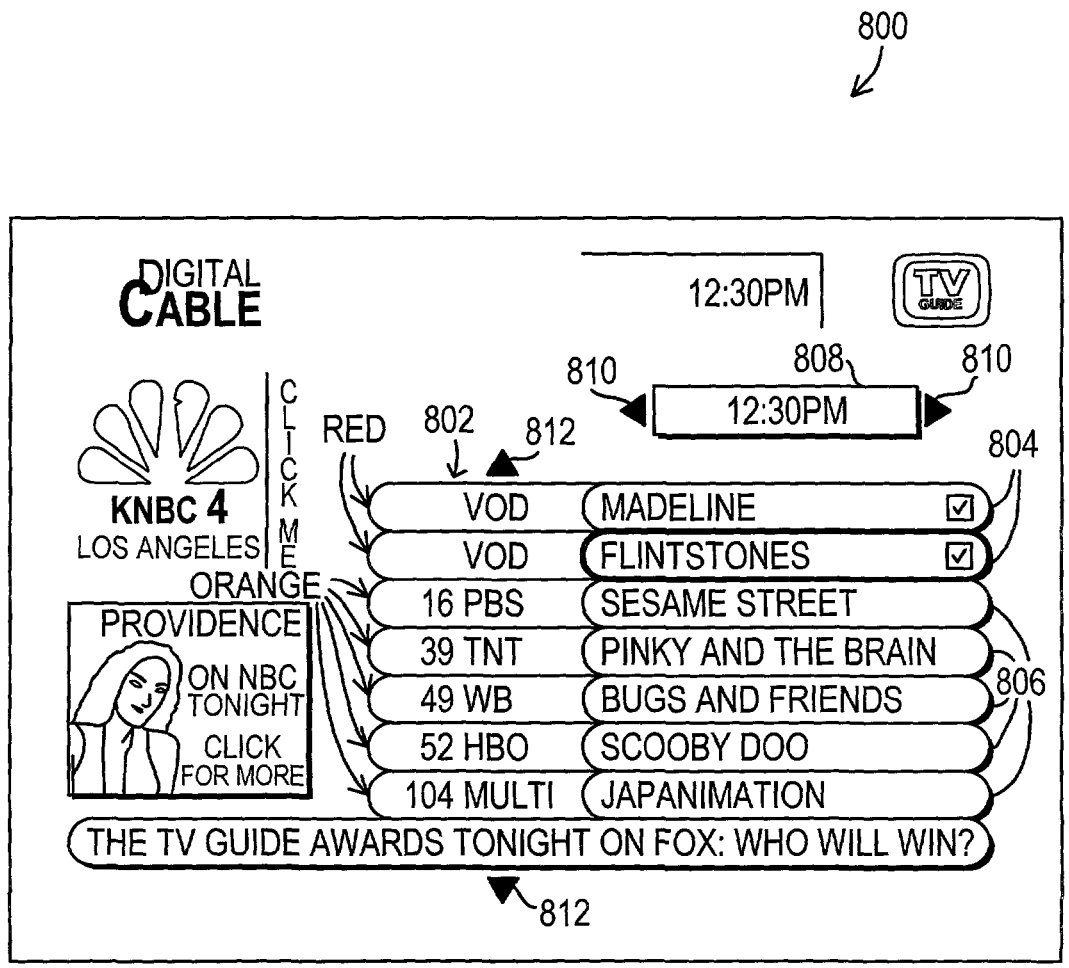
FIG. 19 shows an illustrative interactive television application display with video-on-demand listings and television program listings organized by the children's genre in accordance with various embodiments of the present invention.

FIG. 19 shows an illustrated interactive television application display 800 in which video-on-demand program listings 804 and television program listings 806 of combined listings 802 are organized by the children's genre in accordance with one embodiment of the present invention. The interactive television application may provide display 800 in response to, for example, a user selecting the children's genre option from program listings option 608 of display 600 of FIG. 12. During display generation process, the interactive television application may examine its cache (e.g., memory 204 (FIG. 7) or memory 302 (FIG. 8)) to determine whether the necessary on-demand media data, in this example video-on-demand titles 804, has been cached. For example, if listings for children's programming are commonly accessed, or likely to be accessed, the interactive television application system may have retrieved and cached the data automatically when the user accessed display 600 (FIG. 12) or when the user selected children option 608 (FIG. 12) or at other earlier time. When the data has been cached, the interactive television application may retrieve the information for display. Otherwise, the interactive television application may retrieve the on-demand media data from an on-demand media data source (e.g., on-demand media data source 128 (FIG. 1)). The non-on-demand media data for television program listings 806 may be retrieved from a non-on-demand media data source (e.g., non-on-demand media data source 124 (FIG. 1)) or from the cache.

Combined listings 802 may be organized according to time. Area 808 may indicate the time that the combined listings 802 shown in display 800 may be aired. Arrows 810 may indicate a user may scroll though times to view different combined listings. In some embodiments, set-top box 202 (FIG. 7) may receive user commands from remote control 214 (FIG. 7) to scroll through times in area 808 to view different combined listings. In some embodiments, arrows 812 may indicate that additional television programs and video-on-demand listings may be viewed by a user. In some embodiments, set-top box 202 (FIG. 7) may receive user commands from remote control 214 (FIG. 7) to scroll through program listings 802.

The listings in the displays (e.g., displays illustrated in FIGS. 12-20) provided by the interactive television application system may be color-coded or otherwise visually distinguished to clarify what type of programming is being offered. For example, in display 800 of FIG. 19, video-on-demand options 804 may be colored in red to indicate the options are movies and television program options 806 may be displayed in orange to indicate that the options are regular children's television programs.

Figure 20:
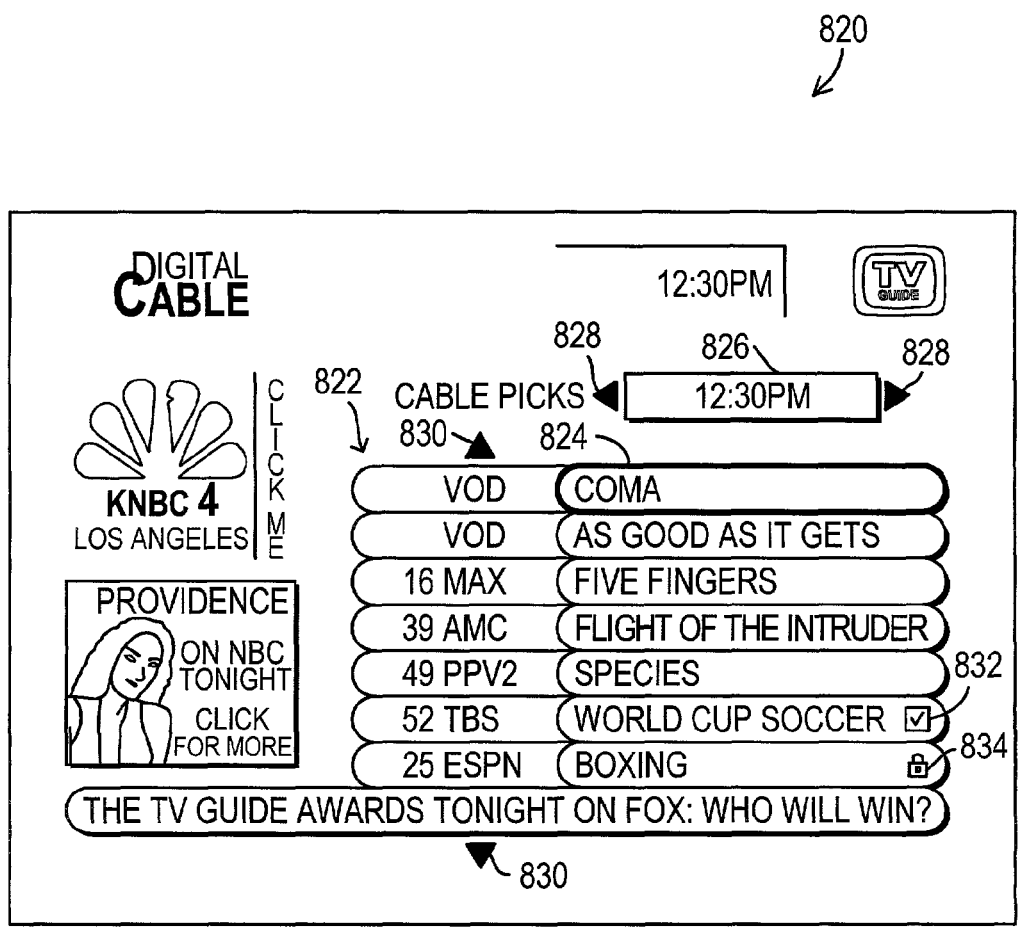
FIG. 20 shows an illustrative interactive television application display promoting video-on-demand listings and television program listings organized by time in accordance with various embodiments of the present invention.

FIG. 20 shows illustrates a recommended viewing display 820 that may be provided to promote video-on-demand programs and television programs in accordance with one embodiment of the present invention. The interactive television application may provide a display such as display 820 of FIG. 20 in response to, for example, a user selecting cable picks option 628 of FIG. 13. During display generation process, the interactive television application may examine its cache (e.g., memory 204 (FIG. 7) or memory 302 (FIG. 8)) to determine whether the necessary on-demand media data, in this example video-on-demand titles, has been cached. For example, if listings for cable picks are commonly accessed, or likely to be accessed, the interactive television application system may have retrieved and cached the data automatically when the user accessed display 620 (FIG. 13) or when the user selected cable picks option 628 (FIG. 13) or at some other previous time. When the data has been cached, the interactive television application may retrieve the information for display. Otherwise, the interactive television application may retrieve the on-demand media data from an on-demand media data source (e.g., on-demand media data source 128 (FIG. 1)). The non-on-demand media data for television program listings may be retrieved from a non-on-demand media data source (e.g., non-on-demand media data source 124 (FIG. 1)) or from the cache.

Display 820 of FIG. 20 may contain cable picks options 822, which is are listings for programming that is being promoted by the operator of a distribution facility (e.g., distribution facility 116 illustrated in FIGS. 2-6) or other suitable entity. The operator may desire to promote popular video-on-demand offerings, programs on premium channels, pay-per-view programming, special events, regular television programs, or any suitable programming.

Combined listings 822 may be organized according to time. Area 826 may indicate the time for listings 822. Arrows 828 may indicate a user may scroll though times to view different combined listings. Arrows 830 may indicate that more listings are available than are shown on display 820. In some embodiments, set-top box 202 (FIG. 7) may receive user commands from remote control 214 (FIG. 7) to scroll through combined listings 822 with highlighted region 824.

Icons may be provided on the listings in any of the listings screens illustrated in FIGS. 12-20. As illustrated in FIG. 20, a check icon 832 may be used to indicate that a pay-per-view program has been ordered or that a reminder has been set for a non-pay-per-view program. As illustrated in FIG. 20, a check icon may be used to indicate that a video-on-demand program has been purchased. Lock icon 834 may be used to indicate when a program has been blocked using the program guide's parental control functions. When the user selects Search from the Program Listings options 608 on display 600 of FIG. 12, the interactive television application may allow the user to perform a search of program listings based on keywords, program title, actors, etc. The interactive television application may search both non-on-demand data and on-demand data for media that matches the specified search criteria. The results of both searches may be combined in a single screen, and titles for both types of media may be intermixed. If desired, the interactive television application may limit the search to only data that is currently cached, to allow a quicker search. Alternatively, the user may be given the option to either search only the cache or to search all data available from the cache, the on-demand server, and the non-on-demand server.

Thus, it is seen that systems and methods for retrieving non-on-demand and on-demand media data have been provided. Persons skilled in the art will appreciate that the present invention can be practiced by other than the described embodiments, which are presented for the purposes of illustration rather than of limitation, and the present invention is limited only by the claims which follow.

What is claimed is:

1. A method for retrieving data for use in an interactive television application system having an interactive television application implemented at least partially on user television equipment, in which non-on-demand media data is provided by a non-on-demand media data source and a plurality of on-demand media data is provided by an on-demand media data source, and wherein the non-on-demand and on-demand media data sources are separate, comprising:
  receiving a broadcast of the non-on-demand media data from the non-on-demand media data source;
  receiving a first user request to display a set of on-demand media data;
  in response to receiving the first user request:
    displaying the set of on-demand media data; and
    automatically retrieving, from the on-demand media data source, additional on-demand media data that corresponds to the displayed set of on-demand media data and that is different from the displayed set of on-demand media data through a client-server connection;
  automatically storing the retrieved additional on-demand media data in a memory on the user television equipment;
  receiving a second user request to access the additional on-demand media data, wherein the second user request is different from the first user request and is received after the additional on-demand media data is stored;
  displaying the additional on-demand media data stored in the memory of the user television equipment in response to the second user request; and
  displaying the non-on-demand media data in response to a user indication to access at least the non-on-demand data.

2. The method of claim 1, wherein the non-on-demand media data received is television program listings data.

3. The method of claim 1, wherein the on-demand media data retrieved is genre data.

4. The method of claim 1, wherein the on-demand media data retrieved is interactive television application software data.

5. The method of claim 1, wherein the on-demand media data retrieved is video-on-demand listings data.

6. The method of claim 1, wherein the on-demand media data retrieved is audio-on-demand listings data.

7. The method of claim 1, wherein the on-demand media data retrieved is interactive video game listings data.

8. The method of claim 1, wherein the on-demand media data retrieved is weather data.

9. The method of claim 1, wherein the on-demand media data retrieved is sports statistics data.

10. The method of claim 1, wherein the on-demand media data retrieved is stock market data.

11. The method of claim 1, further comprising providing metadata contemporaneously with non-on-demand media data.

12. The method of claim 1, further comprising providing metadata contemporaneously with on-demand media data.

13. The method of claim 1, further comprising retrieving on-demand media data from the on-demand media data source in response to a user selection of an on-demand media listing.

14. The method of claim 1, further comprising determining if the on-demand media data is stored on the user television equipment.

15. The method of claim 1, further comprising determining if on-demand media data needs to be retrieved from the on-demand media data source.

16. The method of claim 1, further comprising determining whether a connection exists between the interactive television application system and the on-demand media data source.

17. The method of claim 1, further comprising retrieving on-demand media data from multiple on-demand media data sources.

18. The method of claim 1, further comprising storing on-demand media data from multiple on-demand media data sources.

19. The method of claim 1, further comprising displaying non-on-demand media data and on-demand media data concurrently.

20. The method of claim 1, wherein the set of on-demand media data includes a first page of on-demand media program listings and the additional on-demand media data includes a second page of on-demand media program listings.

21. The method of claim 1, wherein the set of on-demand media data includes a plurality of categories and the additional on-demand media data includes a plurality of on-demand media program listings corresponding to one of the plurality of categories.

22. The method of claim 1, wherein the set of on-demand media data includes a plurality of on-demand media program listings and the additional on-demand media data includes detailed information associated with the plurality of on-demand media program listings.

23. A non-transitory computer-readable media for retrieving data for use in an interactive television application system having an interactive television application implemented at least partially on user television equipment, in which non-on-demand media data is provided by a non-on-demand media data source and a plurality of on-demand media data is provided by a on-demand media data source, and wherein the on-demand and non-on-demand media data sources are separate, where the computer-readable media is encoded with machine-readable instructions for performing the method comprising:
receiving a broadcast of the non-on-demand media data from the non-on-demand media data source;
receiving a first user request to display a set of on-demand media data;
in response to receiving the first user request:
displaying the set of on-demand media data; and
automatically retrieving, from the on-demand media data source, additional on-demand media data that corresponds to the displayed set of on-demand media data and that is different from the displayed set of on-demand media data through a client-server connection;
automatically storing the retrieved additional on-demand media data in a memory on the user television equipment;
receiving a second user request to access the additional on-demand media data, wherein the second user request is different from the first user request and is received after the additional on-demand media data is stored;
displaying the additional on-demand media data stored in the memory of the user television equipment in response to the second user request; and
displaying the non-on-demand media data in response to a user indication to access at least the non-on-demand data.

24. The computer-readable media of claim 23, wherein the non-on-demand media data received is television program listings data.

25. The computer-readable media of claim 23, wherein the on-demand media data retrieved is genre data.

26. The computer-readable media of claim 23, wherein the on-demand media data retrieved is interactive television application software data.

27. The computer-readable media of claim 23, wherein the on-demand media data retrieved is video-on-demand listings data.

28. The computer-readable media of claim 23, wherein the on-demand media data retrieved is audio-on-demand listings data.

29. The computer-readable media of claim 23, wherein the on-demand media data retrieved is interactive video game listings data.

30. The computer-readable media of claim 23, wherein the on-demand media data retrieved is weather data.

31. The computer-readable media of claim 23, wherein the on-demand media data retrieved is sports statistics data.

32. The computer-readable media of claim 23, wherein the on-demand media data retrieved is stock market data.

33. The computer-readable media of claim 23, the computer-readable media further encoded with machine-readable instructions for providing metadata contemporaneously with the non-on-demand media data.

34. The computer-readable media of claim 23, the computer-readable media further encoded with machine-readable instructions for providing metadata contemporaneously with the on-demand media data.

35. The computer-readable media of claim 23, the computer-readable media further encoded with machine-readable instructions for retrieving on-demand media data from the on-demand media data source in response to a user selection of an on-demand media listing.

36. The computer-readable media of claim 23, the computer-readable media further encoded with machine-readable instructions for determining if the on-demand media data is stored on the user television equipment.

37. The computer-readable media of claim 23, the computer-readable media further encoded with machine-readable instructions for determining if on-demand media data needs to be retrieved from the on-demand media data source.

38. The computer-readable media of claim 23, the computer-readable media further encoded with machine-readable instructions for determining whether a connection exists between the interactive television application system and the on-demand media data source.

39. The computer-readable media of claim 23, the computer-readable media further encoded with machine-readable instructions for retrieving on-demand media data from multiple on-demand media data sources.

40. The computer-readable media of claim 23, the computer-readable media further encoded with machine-readable instructions for storing on-demand media data from multiple on-demand media data sources.

41. The computer-readable media of claim 23, the computer-readable media further encoded with machine-readable instructions for displaying non-on-demand media data and on-demand media data concurrently.

42. The computer-readable media of claim 23, the computer-readable media further encoded with computer-readable instructions for automatically establishing a session with a server of the on-demand media data source.

43. The computer-readable media of claim 23, wherein the retrieving is based on a viewing history stored on the user television equipment.

44. The computer-readable media of claim 43, wherein the viewing history comprises at least one of on-demand media data that is commonly accessed by a user, on-demand media data that is likely to be accessed by the user and on-demand media data that is popular among a plurality of users.

45. The computer-readable media of claim 43, wherein the viewing history is generated based on monitored user activity.

46. A system for retrieving data for use in an interactive television application system having an interactive television application implemented at least partially on user television equipment, in which non-on-demand media data is provided by a non-on-demand media data source and a plurality of on-demand media data is provided by a on-demand media data source, and wherein the on-demand and the non-on-demand media data sources are separate, comprising:
means for receiving a broadcast of the non-on-demand media data from the non-on-demand media data source;
means for receiving a first user request to display a set of on-demand media data;
in response to receiving the first user request:
means for displaying the set of on-demand media data; and
means for automatically retrieving, from the on-demand media data source, additional on-demand media data that corresponds to the displayed set of on-demand media data and that is different from the displayed set of on-demand media data through a client-server connection;
means for automatically storing the retrieved additional on-demand media data in a memory on the user television equipment;
means for receiving a second user request to access the additional on-demand media data, wherein the second user request is different from the first user request and is received after the additional on-demand media data is stored;
means for displaying the additional on-demand media data stored in the memory of the user television equipment in response to the second user request; and
means for displaying the non-on-demand media data in response to a user indication to access at least the non-on-demand data.

47. The system of claim 46, wherein the non-on-demand media data received is television program listings data.

48. The system of claim 46, wherein the on-demand media data retrieved is genre data.

49. The system of claim 46, wherein the on-demand media data retrieved is interactive television application software data.

50. The system of claim 46, wherein the on-demand media data retrieved is video-on-demand listings data.

51. The system of claim 46, wherein the on-demand media data retrieved is audio-on-demand listings data.

52. The system of claim 46, wherein the on-demand media data retrieved is interactive video game listings data.

53. The system of claim 46, wherein the on-demand media data retrieved is weather data.

54. The system of claim 46, wherein the on-demand media data retrieved is sports statistics data.

55. The system of claim 46, wherein the on-demand media data retrieved is stock market data.

56. The system of claim 46, further comprising means providing metadata contemporaneously with non-on-demand media data.

57. The system of claim 46, further comprising means for providing metadata contemporaneously with on-demand media data.

58. The system of claim 46, further comprising means for retrieving on-demand media data from the on-demand media data source in response to a user selection of an on-demand media listing.

59. The system of claim 46, further comprising means for determining if the on-demand media data is stored on the user television equipment.

60. The system of claim 46, further comprising means for determining if on-demand media data needs to be retrieved from the on-demand media data source.

61. The system of claim 46, further comprising means for determining whether a connection exists between the interactive television application system and the on-demand media data source.

62. The system of claim 46, further comprising means for retrieving on-demand media data from multiple on-demand media data sources.

63. The system of claim 46, further comprising means for storing on-demand media data from multiple on-demand media data sources.

64. The system of claim 46, further comprising means for displaying non-on-demand media data and on-demand media data concurrently.

65. The system of claim 46, wherein the means for automatically establishing the client-server connection comprises means for automatically establishing a session with a server of the on-demand media data source.

66. The system of claim 46, further comprising means for identifying the additional on-demand media data based on a viewing history stored on the user television equipment.

67. The system of claim 66, wherein the viewing history comprises at least one of on-demand media data that is commonly accessed by a user, on-demand media data that is likely to be accessed by the user and on-demand media data that is popular among a plurality of users.

68. The system of claim 66, wherein the viewing history is generated based on monitored user activity.

69. A system for retrieving data for use in an interactive television application system having an interactive television application implemented at least partially on user television equipment, in which non-on-demand media data is provided by a non-on-demand media data source and a plurality of on-demand media data is provided by an on-demand media data source, and wherein the non-on-demand and on-demand media data sources are separate, comprising:

a communications device for communicating with the on-demand media data source and non-on-demand media data source;
a memory;
a display device;
a user input device;
control circuitry programmed to:
   direct the communications device to receive a broadcast of the non-on-demand media data from the non-on-demand media data source;
receive a first user request to display a set of on-demand media data;
in response to receiving the first user request:
   display on the display device the set of on-demand media data; and
   automatically direct the communications device to retrieve, from the on-demand media data source, additional on-demand media data that corresponds to the displayed set of on-demand media data and that is different from the displayed set of on-demand media data through a client-server connection;
   automatically store the retrieved additional on-demand media data in the memory;
receive a second user request to access the additional on-demand media data, wherein the second user request is different from the first user request and is received after the additional on-demand media data is stored;
in response to receiving the second user request, direct the display device to display the additional on-demand media data stored in the memory; and
in response to receiving a user indication to access at least the non-on-demand media data from the user input device, direct the display device to display the non-on-demand media data.

70. The system of claim 69, wherein the non-on-demand media data received is television program listings data.

71. The system of claim 69, wherein the on-demand media data retrieved is genre data.

72. The system of claim 69, wherein the on-demand media data retrieved is interactive television application software data.

73. The system of claim 69, wherein the on-demand media data retrieved is video-on-demand listings data.

74. The system of claim 69, wherein the on-demand media data retrieved is audio-on-demand listings data.

75. The system of claim 69, wherein the on-demand media data retrieved is interactive video game listings data.

76. The system of claim 69, wherein the on-demand media data retrieved is weather data.

77. The system of claim 69, wherein the on-demand media data retrieved is sports statistics data.

78. The system of claim 69, wherein the on-demand media data retrieved is stock market data.

79. The system of claim 69, wherein metadata is contemporaneously retrieved along with the non-on-demand media data.

80. The system of claim 69, wherein metadata is contemporaneously retrieved with the on-demand media data.

81. The system of claim 69, wherein the control circuitry is directed to determine if the on-demand media data is stored in the cache memory of the user television equipment.

82. The system of claim 69, wherein the control circuitry is directed to determine if on-demand media data needs to be retrieved from the on-demand media data source.

83. The system of claim 69, wherein the control circuitry is directed to determine whether a connection exists between the communications device and the on-demand media data source.

84. The system of claim 69, wherein the control circuitry is directed to retrieve on-demand media data from multiple on-demand media data sources using the communications device.

85. The system of claim 69, wherein the control circuitry is directed to store on-demand media data from multiple on-demand media data sources in the memory.

86. The system of claim 69, wherein the control circuitry is directed to display non-on-demand media data and on-demand media data concurrently on the display device.

87. The method of claim 1, wherein automatically establishing the client-server connection comprises automatically establishing a session with a server of the on-demand media data source.

88. The system of claim 69, wherein the control circuitry is directed to automatically establish a session with a server of the on-demand media data source.

89. The system of claim 69, wherein the control circuitry is directed to identify the additional on-demand media data based on a viewing history stored on the user television equipment.

90. The system of claim 89, wherein the viewing history comprises at least one of on-demand media data that is commonly accessed by a user, on-demand media data that is likely to be accessed by the user and on-demand media data that is popular among a plurality of users.

91. The system of claim 89, wherein the viewing history is generated based on monitored user activity.

92. A method for retrieving data for use with a user equipment device, the method comprising:
receiving a first user request to display a set of on-demand media data;
in response to receiving the first user request:
   displaying the set of on-demand media data; and
   automatically retrieving, from an on-demand media data source, additional on-demand media data that corresponds to the displayed set of on-demand media data and that is different from the displayed set of on-demand media data through a client-server connection;
automatically storing the retrieved additional on-demand media data in a memory of the user equipment device;
receiving a second user request to access the additional on-demand media data, wherein the second user request is different from the first user request and is received after the additional on-demand media data is stored;
displaying the additional on-demand media data stored in the memory of the user equipment device in response to the second user request.

93. A system for retrieving data for use with a user equipment device, the system comprising:
a display device;
a memory on the user equipment device; and
control circuitry configured to:
   receive a first user request to display a set of on-demand media data;
   in response to receiving the first user request:
      display the set of on-demand media data on the display device; and
      automatically retrieve, from an on-demand media data source, additional on-demand media data that corresponds to the displayed set of on-demand media data and that is different from the displayed set of on-demand media data through a client-server connection;

automatically store the retrieved additional on-demand media data in the memory;

receive a second user request to access the additional on-demand media data, wherein the second user request is different from the first user request and is received after the additional on-demand media data is stored;

display, on the display device, the additional on-demand media data stored in the memory in response to the second user request.

* * * * *